United States Patent
Suzuki

(10) Patent No.: US 10,255,130 B2
(45) Date of Patent: Apr. 9, 2019

(54) SEMICONDUCTOR DEVICE

(71) Applicant: Renesas Electronics Corporation, Tokyo (JP)

(72) Inventor: Shinichi Suzuki, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 110 days.

(21) Appl. No.: 15/413,634

(22) Filed: Jan. 24, 2017

(65) Prior Publication Data
US 2017/0277584 A1 Sep. 28, 2017

(30) Foreign Application Priority Data

Mar. 23, 2016 (JP) ................................. 2016-058614

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01); *G06F 11/0757* (2013.01)

(58) Field of Classification Search
CPC .......... G06F 1/08; G06F 1/12; G06F 11/0721; G06F 11/0757; G06F 11/079
See application file for complete search history.

(56) References Cited

U.S. PATENT DOCUMENTS

| | | | |
|---|---|---|---|
| 8,179,924 B2* | 5/2012 | Latremouille | H04J 3/0685 370/509 |
| 9,746,876 B2* | 8/2017 | Vahidsafa | G06F 1/08 |
| 2005/0220234 A1* | 10/2005 | Ichikawa | H04J 3/0602 375/354 |
| 2011/0255546 A1* | 10/2011 | Le Pallec | H04J 3/0679 370/400 |
| 2012/0155603 A1* | 6/2012 | MacKenna | H03K 21/38 377/27 |
| 2012/0254881 A1* | 10/2012 | Hamamoto | G06F 9/522 718/102 |
| 2013/0020978 A1 | 1/2013 | Yamada et al. | |
| 2016/0195894 A1* | 7/2016 | Vahidsafa | G06F 1/08 713/503 |

* cited by examiner

*Primary Examiner* — Charles Ehne
(74) *Attorney, Agent, or Firm* — Mattingly & Malur, PC

(57) ABSTRACT

A semiconductor device includes a first timer that includes a first counter, a second timer that includes a second counter and a controller that includes a CPU in provision of a technology for efficiently diagnosing a fault of a timer that is built in the semiconductor device such as a microcontroller and so forth. The first timer performs time synchronization with the time of external equipment arranged outside the semiconductor device. The controller compares a count value of the first counter with a count value of the second counter and detects a malfunction of the second timer on the basis of a result of comparison.

20 Claims, 20 Drawing Sheets

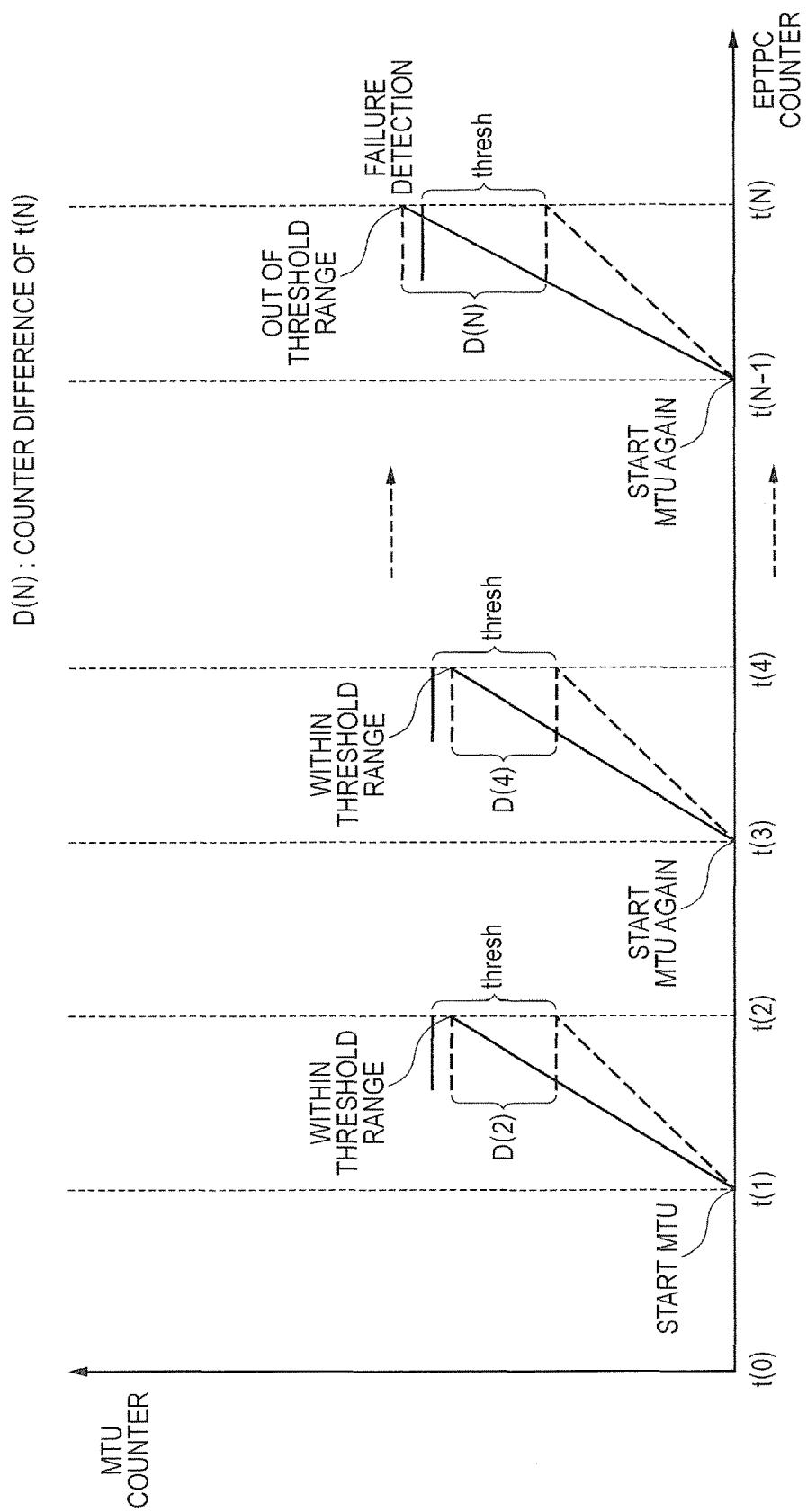

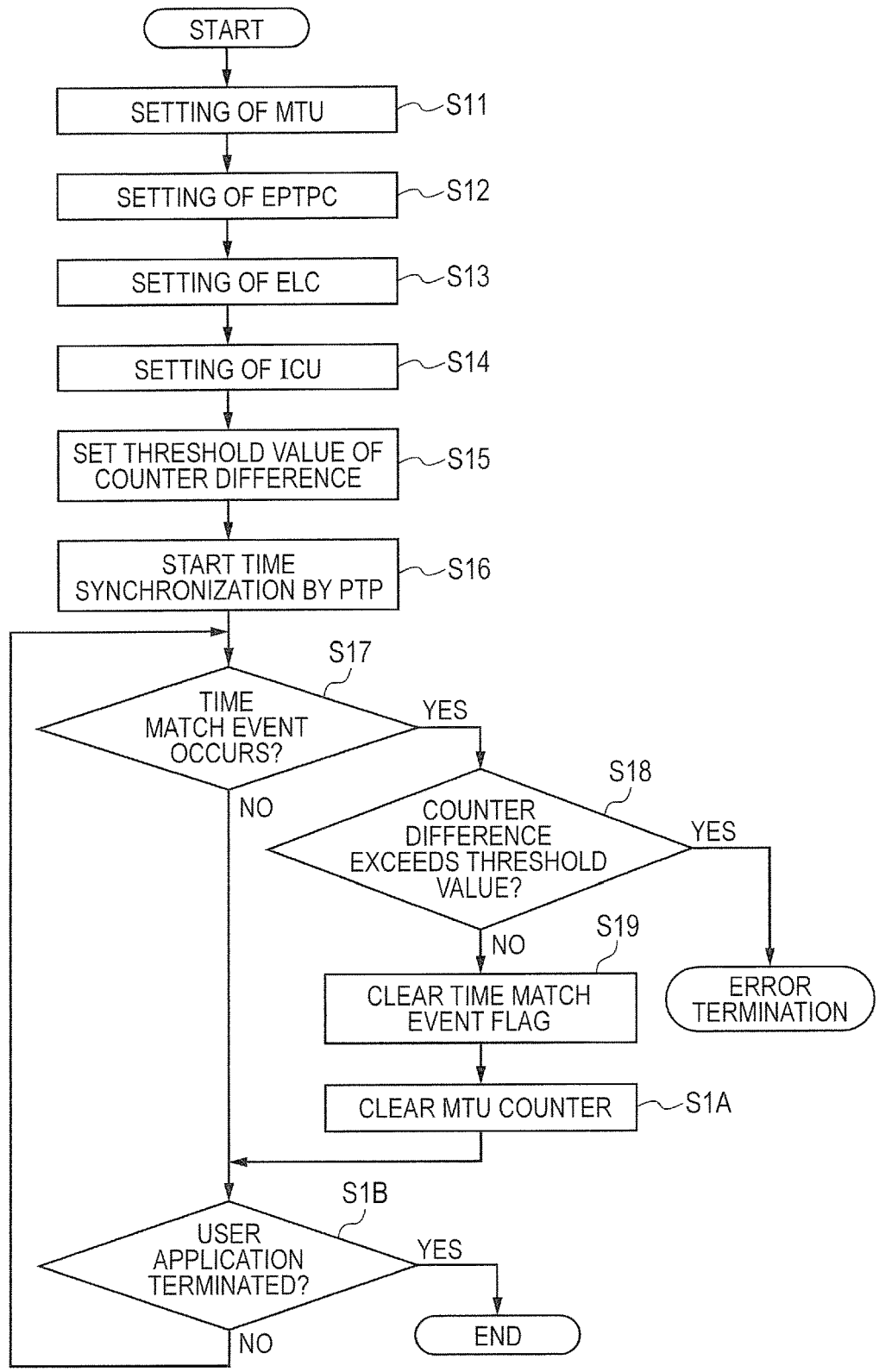

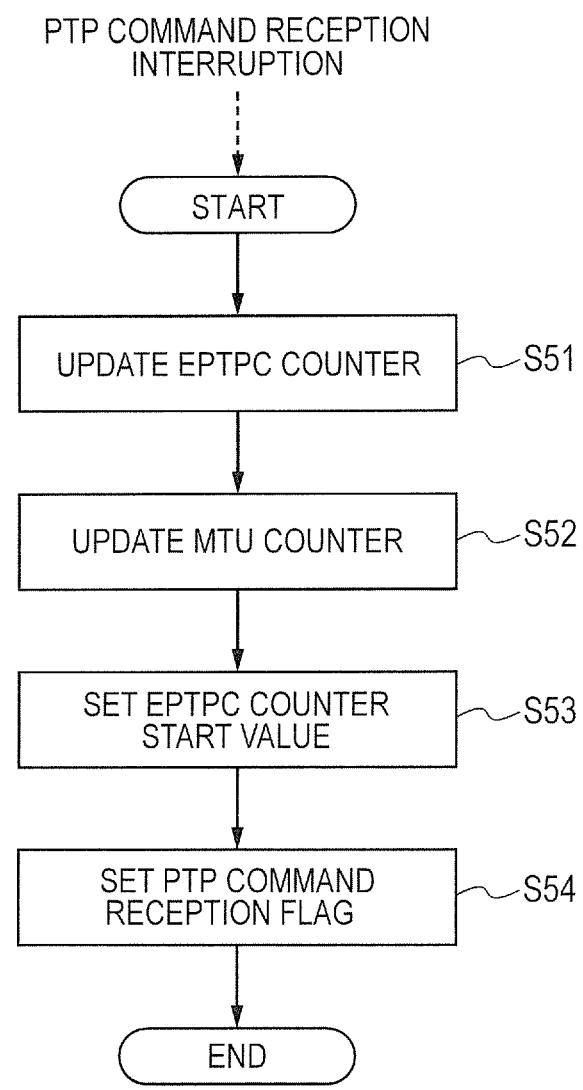

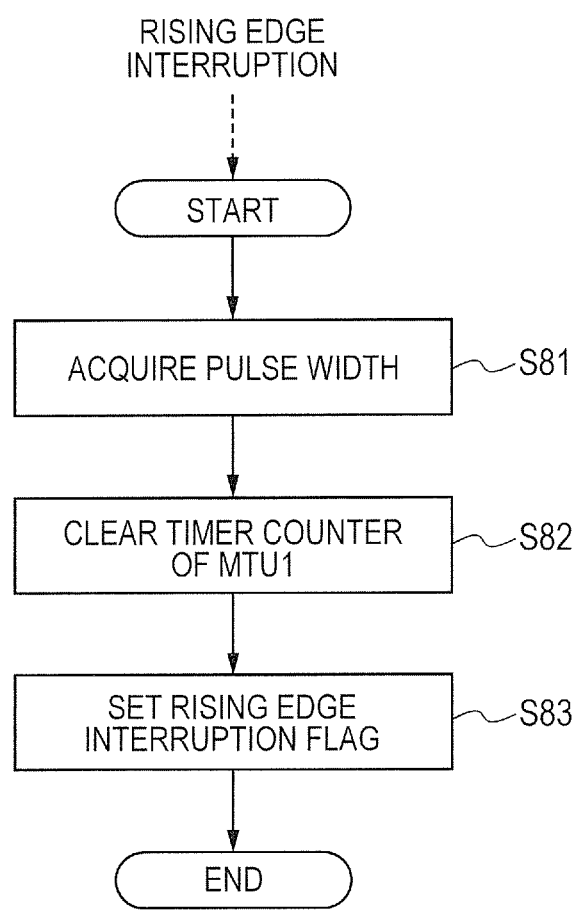

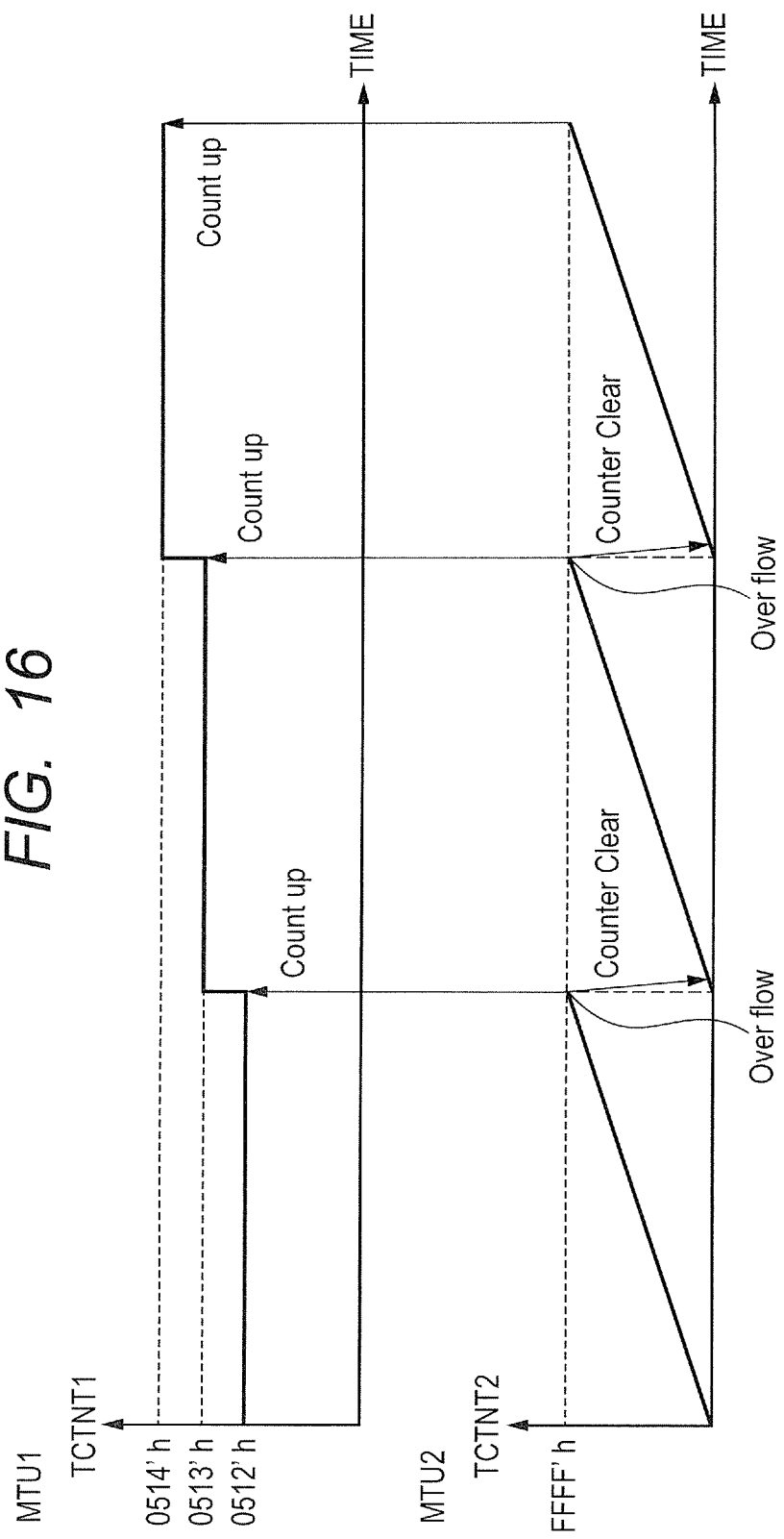

SEMICONDUCTOR DEVICE

CROSS-REFERENCE TO RELATED APPLICATIONS

The disclosure of Japanese Patent Application No. 2016-058614 filed on Mar. 23, 2016 including the specification, drawings and abstract is incorporated herein by reference in its entirety.

BACKGROUND

The present disclosure relates to a semiconductor device, and is applicable to, for example, the semiconductor device of the type that a timer is built therein.

A microcontroller is incorporated into each piece of equipment such as home electric appliances, audiovisual equipment, cell phones, automobiles, industrial machinery and so forth. The microcontroller is a kind of the semiconductor device that controls the operation of each piece of equipment by performing processing in accordance with a program stored in a memory. It is requested for components including the microcontrollers to be incorporated into the above-mentioned pieces of equipment to have the reliability depending on the applications thereof. Therefore, it is requested for the microcontroller to detect a fault that occurs in the microcontroller itself, in addition to detection of faults that occur in a sensor, an actuator and so forth that are to be controlled by diagnosing the above-mentioned sensor, actuator and so forth.

One example of the above-mentioned semiconductor device is disclosed, for example, in U.S. Unexamined Patent Application Publication No. 2013/20978.

SUMMARY

The present disclosure aims to provide a technology for efficiently diagnosing a fault of a timer that is built in the semiconductor device.

Other subjects and novel features of the present disclosure will become apparent from the description of the present specification and the appended drawings.

A representative example of the present disclosure will be briefly described as follows.

That is, according to one embodiment of the present disclosure, there is provided a semiconductor device that includes a first timer that includes a first counter and performs time synchronization with the time of external equipment that is arranged outside the semiconductor device, a second timer that includes a second counter, and a controller that includes a CPU, and compares a count value of the first counter with a count value of the second counter and detects a malfunction (and/or a fault and so forth) of the second timer on the basis of a result of comparison.

According to the semiconductor device of one embodiment of the present disclosure, it is possible to efficiently diagnose the built-in timer.

BRIEF DESCRIPTION OF THE DRAWINGS

FIG. 3B is a timing chart illustrating one example of a relation between an EPTPC counter and an MTU counter.

FIG. 4 is a flowchart illustrating one example of operations of steady processing performed when diagnosing a fault of a counter of a timer.

FIG. 10A is a flowchart illustrating one example of operations of PTP command reception interruption processing performed when diagnosing the fault of the counter pertaining to the situation where the timer generates the PWM waveform signal.

FIG. 15A is a flowchart illustrating one example of operations of rising edge interruption processing performed in PWM waveform comparison.

FIG. 16 is a timing chart illustrating one example of operations of a 32-bit counter according to a fourth embodiment.

DETAILED DESCRIPTION

Figure 1:
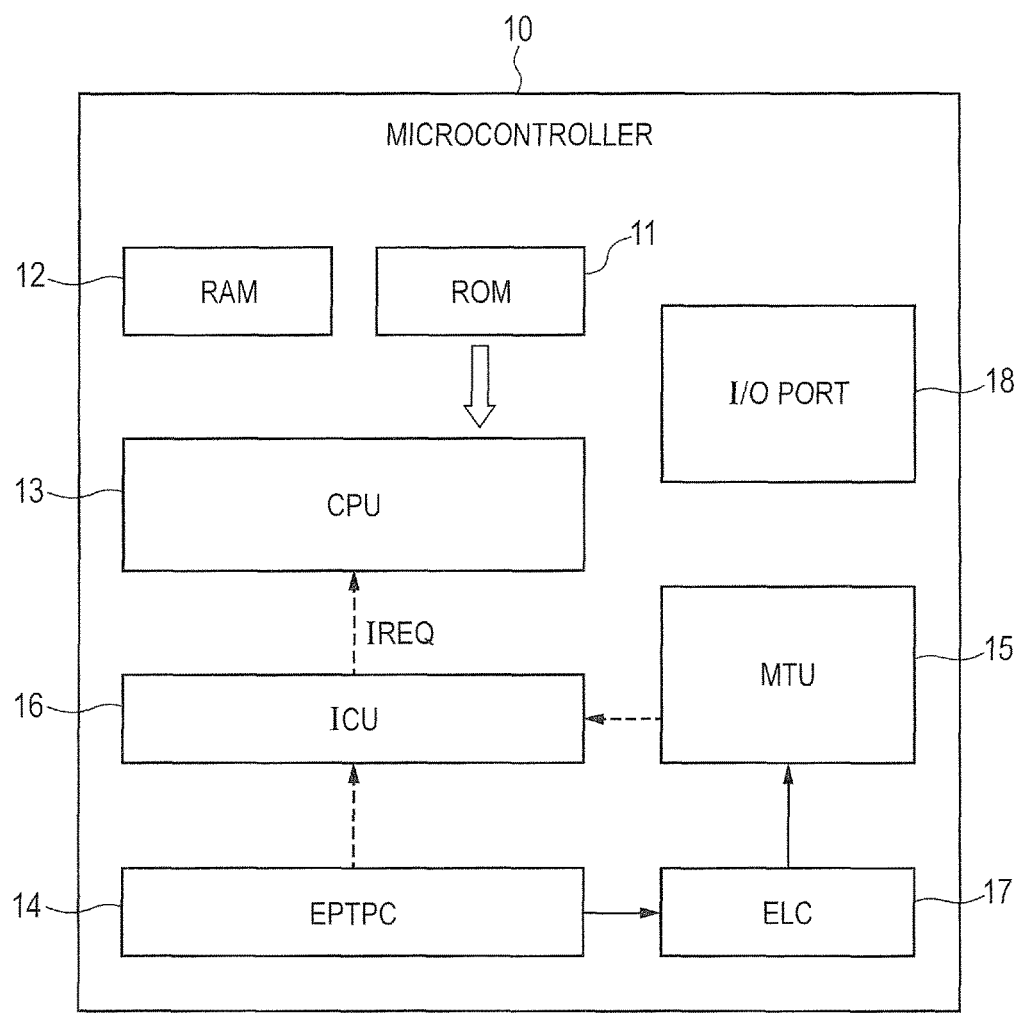
FIG. 1 is a block view illustrating one example of a microcontroller according to a first embodiment of the present disclosure.

In the following, embodiments and practical examples of the present disclosure will be described with reference to the accompanying drawings. However, in the following description, there are cases where the same numerals are assigned to the same constitutional elements and repetitive description thereof is omitted.

In microcontrollers to be loaded on functional safety-oriented equipment such as industrial equipment, automotive-related products and so forth, it is important to detect faults that occur in peripheral modules such as a multifunction timer, an interruption controller, an AD converter and so forth, in addition to detection of faults of a CPU, a built-in memory and so forth. In particular, the multi-function timer is large in circuit scale of a counter and therefore the fault occurs in the multi-function timer with ease. In addition, the design of the multi-function timer is complicated so as to cope with overflow, a leap time and so forth. There are a hard error whose recovery is impossible permanently and a soft error that temporarily occurs and whose recovery is possible in the faults. For example, an MTU (Multi-Function Timer Pulse Unit) that is loaded on the microcontroller is higher in soft error occurrence probability than other peripheral modules and therefore efficient fault diagnosis of the multi-function timer is a matter to be solved.

The inventors and others of the present application have examined the following methods in regard to diagnoses of a built-in timer.

(1) A Diagnosis Using a Verification Program

Basic operations such as starting, counting-up, stopping and so forth are confirmed by practically applying the verification program that has been used when designing the built-in timer.

(2) A diagnosis using another built-in timer

Another built-in timer that is different from the built-in timer to be verified is operated for verification and count values of counters included in these built-in timers are compared with each other so as to obtain a counter difference.

However, in the method (1), only confirmation of a logical on/off operation and a single operation is possible and confirmation of a combined operation that, for example, detection of a quantitative value of the counter and so forth, generation of a PWM (Pulse Width Modulation) waveform signal and so forth are combined together is difficult. In the method (2), when an oscillator that serves as a base of counting operations of the built-in timer to be verified and another built-in timer is shared between these built-in timers, the possibility that the fault may not be detected is high when both of the built-in timers malfunction. In addition, in the methods (1) and (2), it is requested to make the diagnosis by temporarily stopping execution of a user program and therefore the processing efficiency of the user program is reduced.

In one embodiment, a synchronous Ethernet controller operates and stops the counter of the multifunction timer at specific time intervals and diagnoses the fault of the multi-function timer by comparing a count value of the counter of the multi-function timer with a count value of a counter whose time has been adjusted in accordance with Synchronous Ethernet.

According to one embodiment, since an external time is used, a fault detection rate of the multi-function timer is increased. In addition, it is possible to perform the multi-function timer fault diagnosis in parallel with execution of a time synchronization sequence and temporal stopping of execution of the user application program is eliminated.

First Embodiment

A microcontroller according to the first embodiment will be described with reference to FIG. 1. FIG. 1 is a block diagram illustrating one example of a configuration of a microcontroller according to the first embodiment. The microcontroller 10 according to the first embodiment includes a read only memory (ROM) 11, a random access memory (RAM) 12, a central processing unit (CPU) 13 and so forth. In addition, the microcontroller 10 also includes an IEEE1588 controller (hereinafter, an EPTPC) 14, a multi-function timer (an MTU) 15, an ICU (Interrupt Controller Unit) 16, an ELC (Event Link Controller) 17, an I/O port 18 and so forth. The microcontroller 10 is a semiconductor device formed by one semiconductor chip (a semiconductor substrate). The ROM 11 and the CPU 13 are also called controllers. Incidentally, the RAM 12 and the ICU 16 may be also included in the controller. A time synchronization protocol (hereinafter, a PTP (Precision Time Protocol)) based on the IEEE1588 standard (see IEEE1588-2008 Ver2.0 (IEEE1588 synchronous Ethernet Standard)) is used for the fault diagnosis of the MTU 15.

The ROM 11 stores therein a program for detecting the fault of the MTU 15. The ROM 11 is configured by a nonvolatile memory such as, for example, a flash memory and so forth. The RAM 12 stores therein work data used in execution of the program. The RAM 11 is configured by a volatile memory such as, for example, an SRAM and so forth. The CPU 13 executes processing (fault decision) for detecting the fault of the MTU 15 and processing for recovering the MTU 15 in addition to execution of processing of user applications for control operation, communication processing and so forth of the equipment concerned in accordance with the program that has been read out of the ROM 12. The EPTPC 14 performs time synchronization with the time of external equipment (a time distribution source) 2 by using an Ethernet line and in accordance with the PTP. The MTU 15 is a multi-function timer that includes a plurality of channels and in which each channel has a plurality of functions such as a function of generating and outputting a PWM waveform signal, an input capturing function, a function of controlling an industrial motor by using the PWM waveform generating and outputting function and the input capturing function and so forth, in addition to a counting operation performed by counting-up a value and counting-down the value. The ICU 16 notifies the CPU 13 of interrupt requests from the EPTPC 14 and the MTU 15. The ELC 17 reduces a delay caused by intervention of software by coupling an event signal so as to start the operation of the MTU 15 every time the counter of the EPTPC 14 reaches a specific time.

Figure 2:
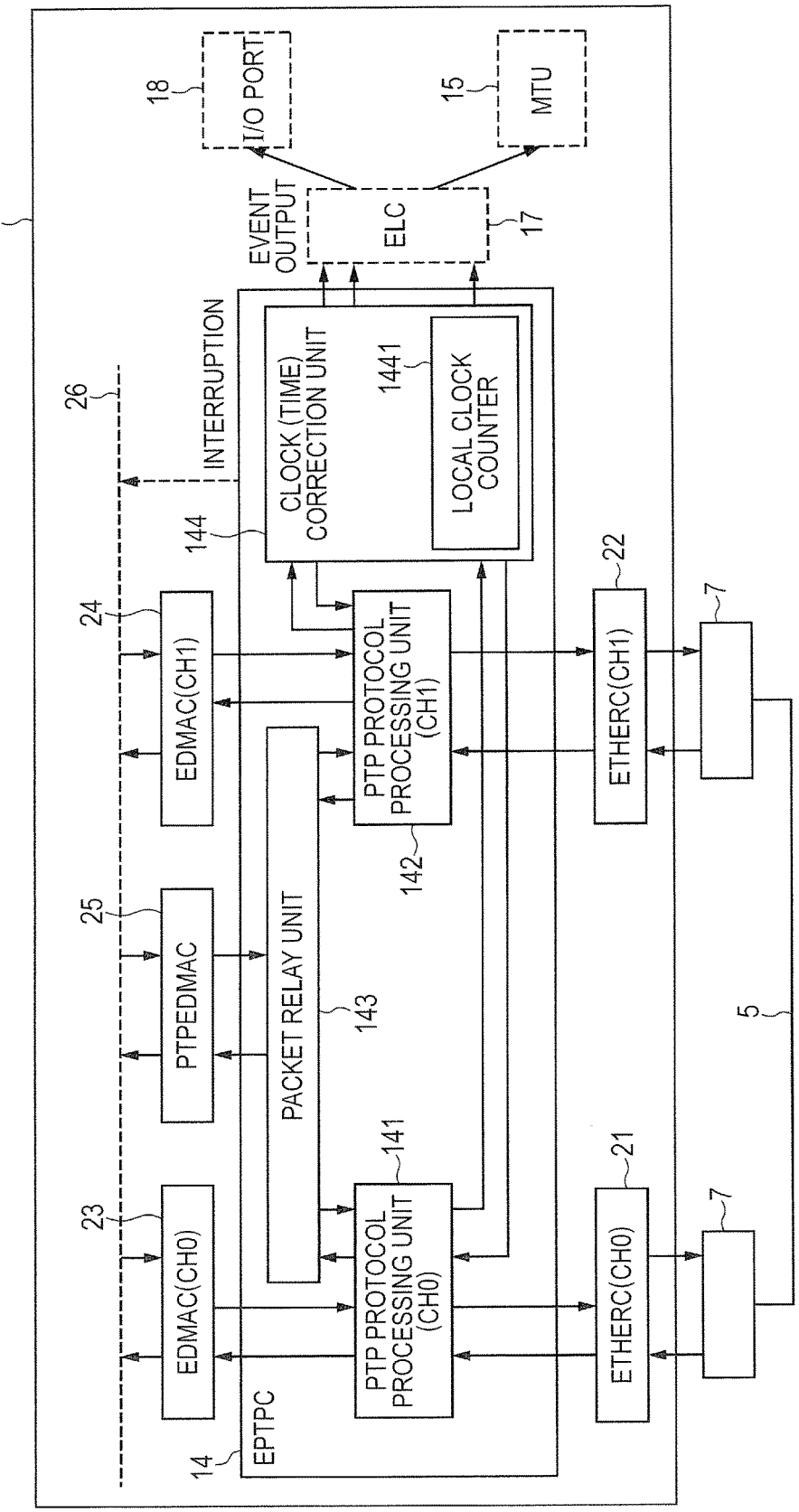
FIG. 2 is a block diagram illustrating one example of an EPTPC illustrated in FIG. 1.

Next, the EPTPC 14 will be described by using FIG. 2. FIG. 2 is a block diagram illustrating one example of configurations of the EPTPC 14 and hardware relevant to the EPTPC 14 in FIG. 1.

The EPTPC 14 includes a 0th channel PTP protocol processing unit (CH0) 141, a first channel PTP protocol processing unit (CH1) 142, a packet relay unit 143, a clock (time) correction unit 144 and so forth. The 0th channel PTP protocol processing unit (CH0) 141 and the first channel PTP protocol processing unit (CH1) 142 perform protocol processing such as PTP frame transmission-reception processing, command sequence processing and so forth. The packet relay unit 143 performs processing of relaying and correcting Ethernet frames (hereinafter, the frames) that have been processed by the 0th channel PTP protocol processing unit (CH0) 141 and the first channel PTP protocol processing unit (CH1) 142. The clock (time) correction unit 144 includes a local clock counter 1441 that serves as a counter of the EPTPC 14 and has a function of correcting the time so as to be adjusted to the time of the time distribution source, a function of notifying the CPU 13 of reception of an interrupt via the ICU 16 at a specific time.

In general, the EPTPC 14 uses a 0th channel ETHERC (Ethernet Controller) (CH0) 21 and a first channel ETHERC (CH1) 22, a 0th channel EDMAC (DMA Controller for the Ethernet Controller) (CH0) 23 and a first channel EDMAC (CH1) 24, and a PTPEDMAC 25 by combining them together. The 0th channel ETHERC (CH0) 21 and the first channel ETHERC (CH1) 22 perform processing corresponding to a MAC layer. The 0th channel EDMAC (CH0) 23 and the first channel EDMAC (CH1) 24 each is adapted to efficiently process and manage a standard frame and serves as an interface with the CPU 13. The PTPEDMAC 25 processes the frame of the PTP. The EPTPC 14 inputs/outputs the standard/PTP frame, relative to an Ethernet cable 5 via a physical layer (PHY) (not illustrated) that performs digital-signal to analog-signal conversion and an Ethernet connector (in general, an RJ-45) 7. In addition, the EPTPC 14 is coupled to the MTU 15 and the I/O port 18 via the ELC 17 and has a function of starting counting of the value of a timer counter of the MTU 15 and a later described pulse outputting function (a pulse output timer function) at a time that has been synchronized with the time of the external equipment in accordance with the PTP. Although, in FIG. 2, a two-channel configuration that the 0th channel PTP protocol processing unit (CH0) 141 and the first channel PTP protocol processing unit (CH1) 142, the 0th channel ETHERC (CH0) 21 and the first channel ETHERC (CH1) 22, and the 0th channel EDMAC (CH0) 23 and the first channel EDMAC (CH1) 24 are loaded on the microcontroller 10 is illustrated, the microcontroller 10 may have a one-channel configuration.

Figure 3A:
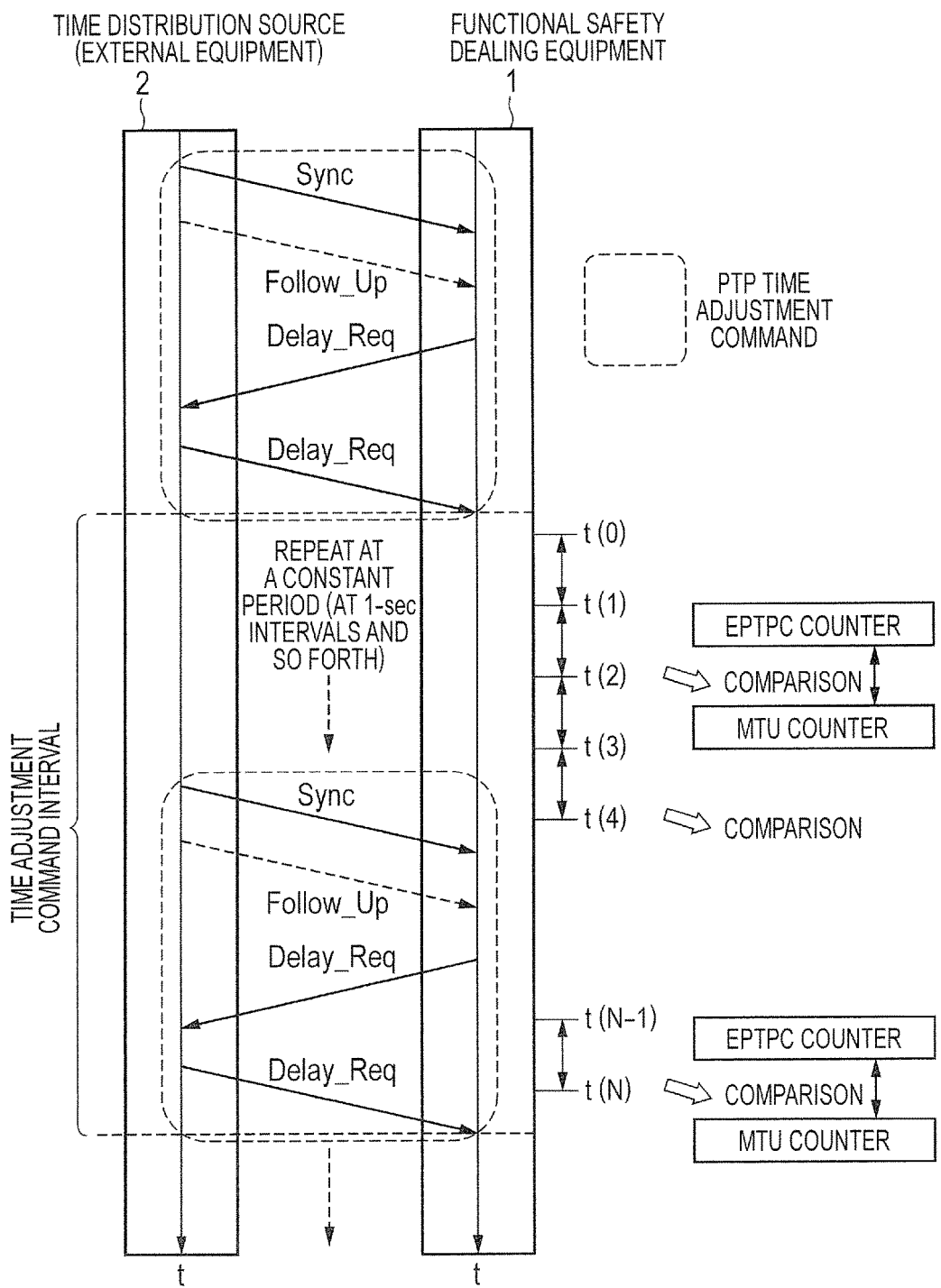
FIG. 3A is a diagram illustrating one example of time synchronization.

Next, one example of a configuration of the MTU 15 for the fault diagnosis will be described using FIG. 3A and FIG. 3B. FIG. 3A is a diagram illustrating one example of time synchronization between functional safety-oriented equipment and external equipment that is a time distribution source. FIG. 3B is a timing chart illustrating one example of a relation between an EPTPC counter and an MTU counter.

The configuration for the fault diagnosis in FIG. 3A and FIG. 3B is directed to a case of performing time synchronization with the time of the external equipment 2 that is the time distribution source on functional safety-oriented equipment 1 that the microcontroller 10 is loaded in accordance with the PTP and of counting the values of the counters by the MTU 15.

(11) The microcontroller 10 of the functional safety-oriented equipment 1 sets a time interval for fault detection as an interval of a time match event based on the PTP.

(12) The microcontroller 10 starts time synchronization with the time of the external equipment 2 that is the time distribution source at an interval (here, it is set to one second) of commands issued for fixed time adjustment in accordance with the PTP. The commands for PTP-based time adjustment are Sync, Follow_Up, Delay_Req, Delay_Resp and so forth.

(13) The microcontroller 10 starts counting-up of the counter of the MTU at a time t(1) of the local clock counter 1441 of the EPTPC 14.

(14) The microcontroller 10 compares gaining degrees of the EPTPC counter that has been synchronized with the external equipment and the MTU counter every time, a PTP-based time match event that has been set in (11) occurs (t(2), t(4), . . . t(N)).

(15) When an absolute value of a counter difference is in excess of a range of a threshold value that has been defined in advance in the above (14), the microcontroller 10 detects it as a fault of the counter. In addition, when the absolute value is within the range of the threshold value, the microcontroller 10 continues comparison of the gaining degrees of the counters per time synchronization in the above (14).

A broken line in FIG. 3B indicates a case where there is no difference in count value between the EPTPC counter and the MTU counter (the counter difference=0) and a solid line indicates a case where the MTU counter is ahead of the EPTPC counter (the counter difference is present). In the example in FIG. 3B, although a counter difference (D(2)) at the time t(2), a counter difference (D(4)) at the time t(4), . . . and so forth are within the threshold value range, a counter difference (D(N)) at a time t(N) is out of the threshold value range and the fault is detected.

Figure 5A:
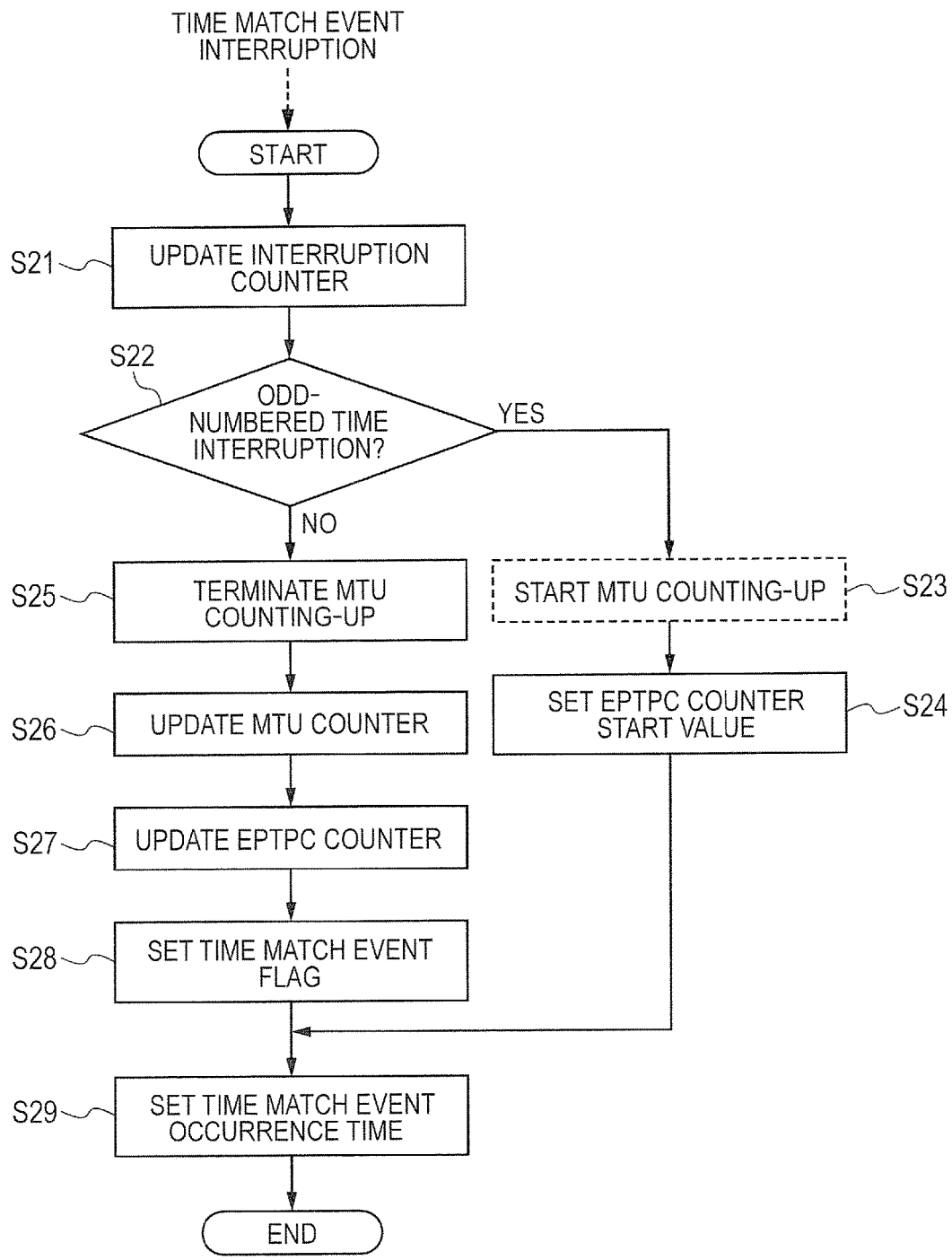
FIG. 5A is a flowchart illustrating one example of operations of time match event interruption processing performed when diagnosing the fault of the counter of the timer.
Figure 5B:
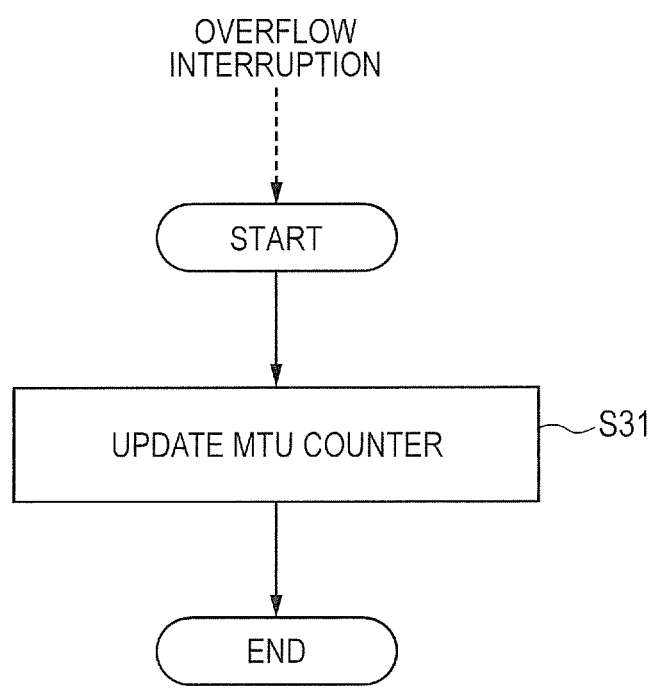
FIG. 5B is a flowchart illustrating one example of operations of overflow interruption processing performed when diagnosing the fault of the counter of the timer.

Next, operation flows by software for the fault diagnosis of the timer counter will be described using FIG. 4, FIG. 5A and FIG. 5B. FIG. 4 is a flowchart illustrating one example of operations of steady processing performed when diagnosing the fault of the timer counter. FIG. 5A is a flowchart illustrating one example of operations of time match event interruption processing performed when diagnosing the fault of the timer counter. FIG. 5B is a flowchart illustrating one example of operations of overflow interruption processing performed when diagnosing the fault of the timer counter. Here, as interrupts (that is, interrupt signals), a time match event interrupt generated from the EPTPC 14 and an overflow interrupt generated from the MTU 15 are used. When the value of the local clock counter 1441 of the EPTPC 14 has matched a specific set value, the time match event interrupt is generated from the EPTPC 14 and counting of the value of the timer counter of the MTU 15 is started simultaneously with generation of the interrupt. When the value of a timer counter (for example, a 16-bit counter) has overflown, the overflow interrupt is generated from the MTU 15.

<Steady Processing>

Step S11: After the user application has been started, the CPU 13 starts execution of software for timer fault diagnosis. Then, the CPU 13 performs setting of a prescaler (a frequency ratio of a clock signal supplied to the MTU 15 to an output of the timer counter of the MTU 15) of the MTU 15, counting operation modes (a free run mode, a compare match mode, a PWM waveform output mode and so forth) and the interrupts, initialization (mtu_count←0) of the MTU counter and so forth.

Step S12: The CPU 13 performs setting of a synchronization mode, the time match event, a time match event occurrence time and so forth of the EPTPC 14.

Step 13: The CPU 13 sets the ELC 17 so as to couple the time match event of the EPTPC 14 to a start factor of the MTU 15.

Step S14: The CPU 13 sets the ICU 16 so as to notify the CPU 13 of the overflow interrupt generated from the MTU 15 and the time match event interrupt generated from the EPTPC 14. In addition, the CPU 13 initializes a time match event flag (ptp_flag←false).

Step S15: The CPU 13 sets an upper limit value of absolute values of the difference in count value between the MTU counter (mtu_count) and the EPTPC counter (ptp_count) used for decision in fault detection as a threshold value. The threshold value (thresh) is set by taking an error of the timer counter of the MTU 15 that would occur due to the presence of an oscillator, a delay caused by interruption processing, an error on the protocol operation of the PTP and so forth into consideration. One example of the threshold value will be indicated by the later described formula (2). Here, the MTU counter (mtu_count) and the EPTPC counter (ptp_count) are software elements used for decision in fault detection and are not hardware elements, that is, are not the timer counter of the MTU 15 and the local clock counter 1441 of the EPTPC 14 in hardware.

Step S16: The CPU 13 starts time synchronization with the time of the external equipment 2 that is the time distribution source in accordance with the PTP by using the EPTPC 14. Here, one piece of equipment having the most accurate clock signal is selected from one piece or the plurality of pieces of equipment as the external equipment 2 that is the time distribution source in accordance with the PTP.

Step S17: The CPU 13 confirms whether the time match event occurs. Whether the time match event occurs is decided using the time match event flag (ptp_flag). In case of YES (the time match event has occurred) (ptp_flag=true), the CPU 13 proceeds to the process in step S18 and in case of NO, the CPU 13 proceeds to the process in step S1B. Incidentally, the time match event flag (ptp_flag) is set in step S28 for later described interruption processing.

Step S18: The CPU 13 confirms whether the absolute value of the counter difference exceeds the threshold value. The counter different is a difference obtained by subtracting the EPTPC counter (ptp_count) that has been weighted with a ratio of an operating frequency ($f_{mtu}$) of the MTU 15 to an operating frequency ($f_{ptp}$) of the EPTPC 14 from the MTU counter (mtu_count).

$$\text{Counter difference} = |\text{mtu\_count} - (f_{mtu}/f_{ptp})\text{ptp\_count}|$$

When the counter difference exceeds the threshold value (YES), the CPU 13 detects it as the fault and terminates the process with error. When the counter difference does not exceed the threshold value (NO), the CPU 13 proceeds to the process in step S19.

Step S19: The CPU 13 clears the time match event flag (ptp_flag←false).

Step S1A: The CPU 13 clears the MTU counter (mtu_count←0).

Step S1B: The CPU 13 decides whether the user application is terminated. When the user application is terminated (YES), the CPU 13 terminates the process. When the user application is not terminated (NO), the CPU 13 returns to step S17 and continues execution of the process.

<Interruption Processing>

In the following, time match event interruption processing will be described.

Step S21: When the time match event interrupt has been generated from the EPTPC 14 (t(0), t(1), t(3), t(4), . . . t(N−1) and T(N)), the CPU 13 performs updating by incrementing the value of the interruption counter that indicates a time match event interruption processing occurrence frequency by one (N←N+1).

Step S22: The CPU 13 decides whether the interrupt is an odd-numbered interrupt (t(1), t(3), . . . t(2n−1)). The decision is made by referring to an interrupt counter (N). In case of the odd-numbered interrupt (YES), the CPU 13 proceeds to the process in step S23. In case of an even-numbered interrupt (NO), the CPU 13 proceeds to the process in step S25.

Step S23: The timer counter of the MTU 15 starts a counting-up operation. Here, although the counting-up operation of the timer counter of the MTU 15 is started by coupling the event signal by the ELC 17 and therefore execution of software processing by the CPU 13 is not requested, the software processing will be described for convenience of explanation of the operation. Incidentally, when the ELC 17 is not used, it is requested to execute the software processing by the CPU 13.

Step S24: The CPU 13 reads out a count value (LCCV) of the local clock counter 1441 of the EPTPC 14 and sets the read-out count value as a start value of the EPTPC counter (ptp_start←LCCV). Then, the CPU 13 proceeds to the process in step S29.

Step S25: The CPU 13 terminates the counting-up operation of the timer counter of the MTU 15.

Step S26: The CPU 13 reads out a count value (TCNT) of the timer counter of the MTU 15 and updates the value of the MTU counter using the read-out count value. An updated value is a value obtained by adding the count value of the timer counter of the MTU 15 to the current value of the MTU counter (mtu_count←mtu_count+TCNT). In some cases, the value of the MTU counter is updated with the overflow interrupt that is generated from the MTU 15 in step S31.

Step S27: The CPU 13 reads out the count value of the local clock counter 1441 of the EPTPC 14 and updates the value of the EPTPC counter by using the read-out count value. An updated value is a value obtained by subtracting the start value of the EPTPC counter that has been set in step S24 from the count value of the local clock counter 1441 of the EPTPC 14 (ptp_count←LCCV−ptp_start).

Step S28: The CPU 13 sets the time match event flag (ptp_flag←true).

Step S29: The CPU 13 sets a time that the next time match event is to be generated to the EPTPC 14. Incidentally, the time may be a time that is the same as the previous time in time interval and the time interval of the time for generation of the next time match event may be changed from that of the previous time.

Next, in the following, the overflow interrupt will be described.

Step S31: When the overflow interrupt has been generated from the MTU 15, the CPU 13 updates the value of the MTU counter to a value obtained by adding an overflow value (in case of the 16-bit counter, $2^{16}$=65,536) to the current value of the MTU counter (mtu_count←mtu_count+the overflow value).

One Example of the Threshold Value

One example of the threshold value (thresh) will be described. When the threshold value is separated into "$\text{thresh}_{osc}$" that is caused by the error of the timer counter of the MTU 15 due to the presence of the oscillator, "$\text{thresh}_{ptp}$" caused by the error on the protocol operation of the PTP, "$\text{thresh}_{int}$" caused by the interruption processing and "$\text{thresh}_{flu}$" caused by a fluctuation in processing that would occur depending on states of a pipeline and a bus of the CPU 13, the formula (1) is established.

$$\text{thresh} = \text{thresh}_{osc} + \text{thresh}_{ptp} + \text{thresh}_{int} + \text{thresh}_{flu} \qquad (1)$$

Here, the contribution of other factors such as temperature characteristics and so forth is ignored because it is sufficiently smaller than the contribution of the above-mentioned values.

When an operating frequency of the MTU 15 is $f_{mtu}$, the accuracy of the oscillator that supplies the clock signal to the MTU 15 is $x_{osc}$ and a time match event interval is $t_{p1}$, "$\text{thresh}_{osc}$" caused by the error of the timer counter of the MTU 15 due to the presence of the oscillator is indicated by the formula (1-1) in count number of the MTU counter.

$$\text{thresh}_{osc} = f_{mtu} * x_{osc} * t_{p1} \qquad (1\text{-}1)$$

For example, when $f_{cpu}$=120 MHz, the MTU 15 is divided by 16 in frequency by the prescaler, $f_{mtu}$=$f_{cpu}$/16=7.5 MHz, $x_{osc}$=100 ppm, and $t_{p1}$=100 ms, $\text{thresh}_{osc}$=75 cycles is obtained.

The error on the protocol operation of the PTP includes an error of the oscillator that supplies the clock signal to the EPTPC 14, a command interval for time adjustment, a command delay that would occur depending on the state of the bus on Ethernet and so forth similarly to the error of the MTU 15. When the EPTPC 14 has been incorporated into the microcontroller 10, a reduction in error down to 1 µs to 100 ns in time becomes possible by execution of the protocol operation by hardware elements and time correction by the clock (time) correction unit 144 that corrects the time so as to be adjusted to the time of the external equipment 2 that is the time distribution source. In this case, "$\text{thresh}_{ptp}$" amounts to 10 cycles to 1 cycle in count number of the MTU counter and it means that $\text{thresh}_{ptp} < \text{thresh}_{osc}$.

When an operating frequency of the CPU 13 is $f_{cpu}$, the interruption processing occurrence frequency is $x_{int}$ and a cycle number of the interruption processing is $n_{int}$, "$\text{thresh}_{int}$" caused by the interruption processing is indicated by the formula (1-2) in count number of the MTU counter.

$$\text{thresh}_{int} = (f_{mtu}/f_{cpu}) * (x_{int} * n_{int}) \tag{1-2}$$

Here, the time match event interruption processing is made the same as the overflow interruption processing approximately in cycle number at the operating frequency of the CPU 13.

For example, it is assumed that $f_{cpu}$=120 MHz and $f_{mtu} = f_{cpu}/16$=7.5 MHz. In the interruption processing, $n_{int}$=100 cycles is obtained by adding also an interruption response time and a recovery time, setting the interruption response time to 10 cycles, setting the interruption recovery time to 10 cycles and setting the interruption processing to 80 cycles in average. The overflow of the 16-bit counter occurs per 8.7 ms (=65,536/7.5*$10^6$ s). Therefore, when the overflow interruption processing is performed 11 times (=100/8.7), $x_{int}$=13 times is established by adding the time match event interruption processing that has been performed two times and $\text{thresh}_{int}$=81 cycles is obtained.

"$\text{thresh}_{flu}$" is the upper limit value of the fluctuation in processing that the CPU 13 of the microcontroller 10 executes and is smaller than "$\text{thresh}_{int}$" and therefore $\text{thresh}_{flu} < \text{thresh}_{int}$.

While "$\text{thresh}_{osc}$" is the upper limit value of the error, "$\text{thresh}_{int}$" is the average value of the interruption processing. Although the contribution of "$\text{thresh}_{int}$" is larger than the contribution of "$\text{thresh}_{osc}$", it is applied as the worst value in fault detection. From the above, the formula (1) is approximated as the formula (2).

$$\begin{aligned}\text{Thresh} &= \text{thresh}_{osc} + \text{thresh}_{ptp} + \text{thresh}_{int} + \\ & \text{thresh}_{flu} < \text{thresh}_{osc} + \text{thresh}_{osc} + \text{thresh}_{int} + \\ & \text{thresh}_{int} = f_{mtu}/f_{cpu}) * (2 * f_{cpu} * f_{osc} * t_{p1} + 2 * x_{int} * n_{int})\end{aligned} \tag{2}$$

When the above-mentioned numerical values are applied to the formula (2), thresh=312 cycles is obtained.

In the first embodiment, the fault of the timer counter (a second counter) of the MTU 15 (a second timer) is diagnosed in accordance with the value of the local clock counter (a first counter) 1441 of the EPTPC 14 (a first timer) whose time has been adjusted to the time of the external equipment 2 that is the time distribution source.

According to the first embodiment, since it is possible to use the plurality of external times for the diagnosis of the fault in accordance with the PTP, there is no malfunction caused by abnormality of the oscillator that is shared in fault diagnosis and it is possible to diagnose the fault of the timer on the basis of the highly accurate time. In addition, since it is possible to perform the fault diagnosis of the timer in parallel with execution of a PTP-based time synchronization operation, it is possible to more suppress a reduction in processing efficiency of the user program than the case where the fault diagnosis of the timer has been performed by stopping execution of the user program.

Second Embodiment

Figure 6:
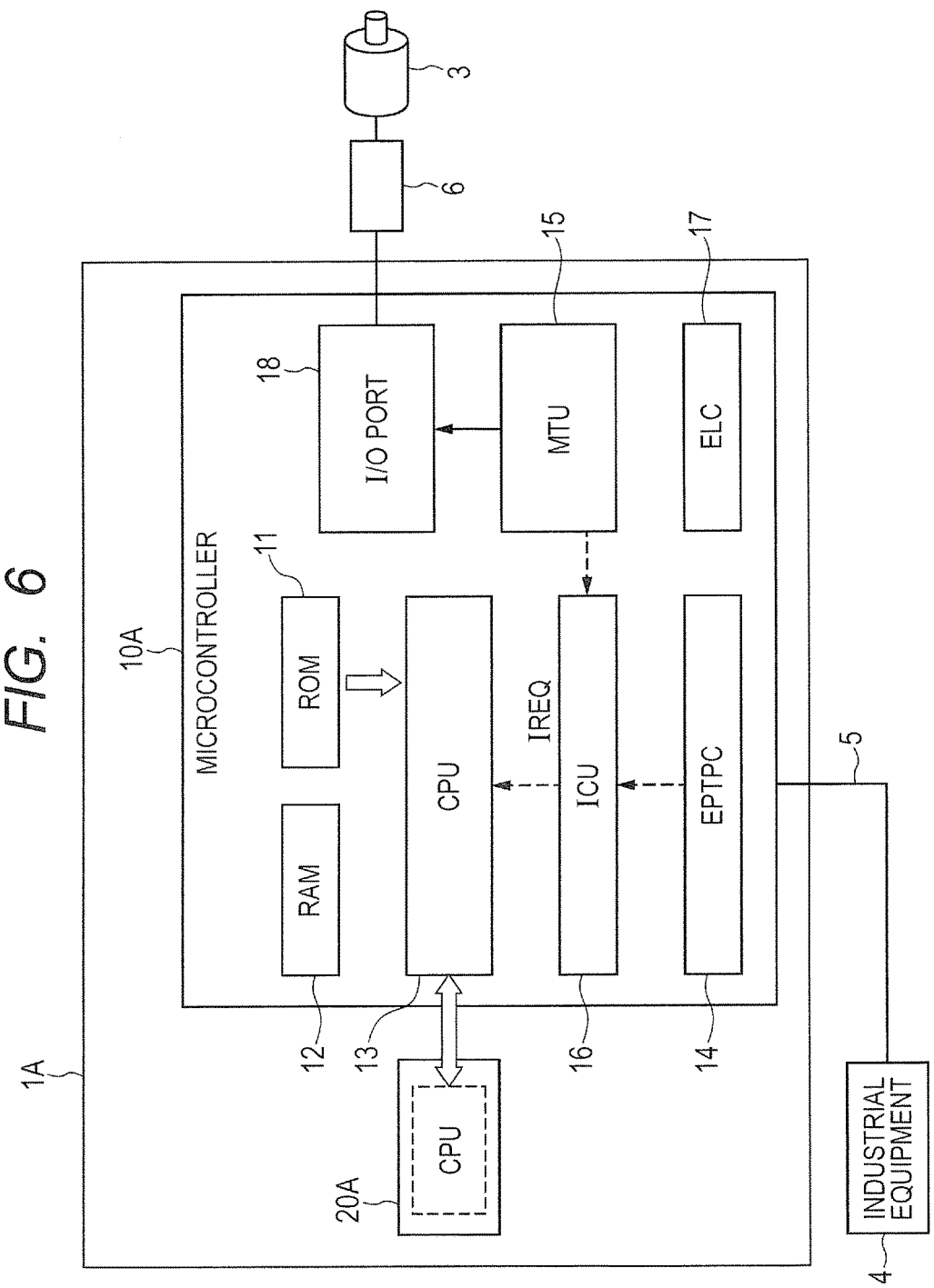
FIG. 6 is a block diagram illustrating one example of a functional safety-oriented industrial motor control system according to a second embodiment.

A case where the microcontroller is applied to functional safety-oriented industrial equipment will be described using FIG. 6. FIG. 6 is a block diagram illustrating one example of a configuration of an industrial motor control system according to the second embodiment.

A microcontroller 10A is mounted on functional safety-oriented equipment 1A, controls the operation of the functional safety-oriented equipment 1A, controls the operation of an industrial motor 3 and communicates with other pieces of industrial equipment 4 (such as a robot, an AC servo motor, a machine tool and so forth) that are coupled with the Ethernet cable 5 over a network. Incidentally, in functional safety standards (IEC61508 Part 7) and so forth, mutual monitoring is requested in accordance with the level of compliance and there are cases where two microcontrollers (the microcontroller 10A and a microcontroller 20A) are mounted on the functional safety-oriented equipment 1A.

It is requested to protect a region that safety data on the ROM 11 and the RAM 12 is arranged by a memory management unit (MMU), a memory protection unit (MPU) and so forth by separating this region from a region that non-safety data is arranged in order to cope with the functional safety. Therefore, the not illustrated memory management unit (MMU) and/or memory protection unit (MPU) are/is loaded on the microcontroller 10A, in addition to the configuration of the microcontroller 10 according to the first embodiment. The microcontroller 10A and the industrial motor 3 are coupled together via a motor driver 6. Then, the industrial motor 3 is controlled by controlling the motor driver 6 in accordance with a PWM waveform signal that is generated by the MTU 15 and is output from the I/O port 18.

Figure 7:
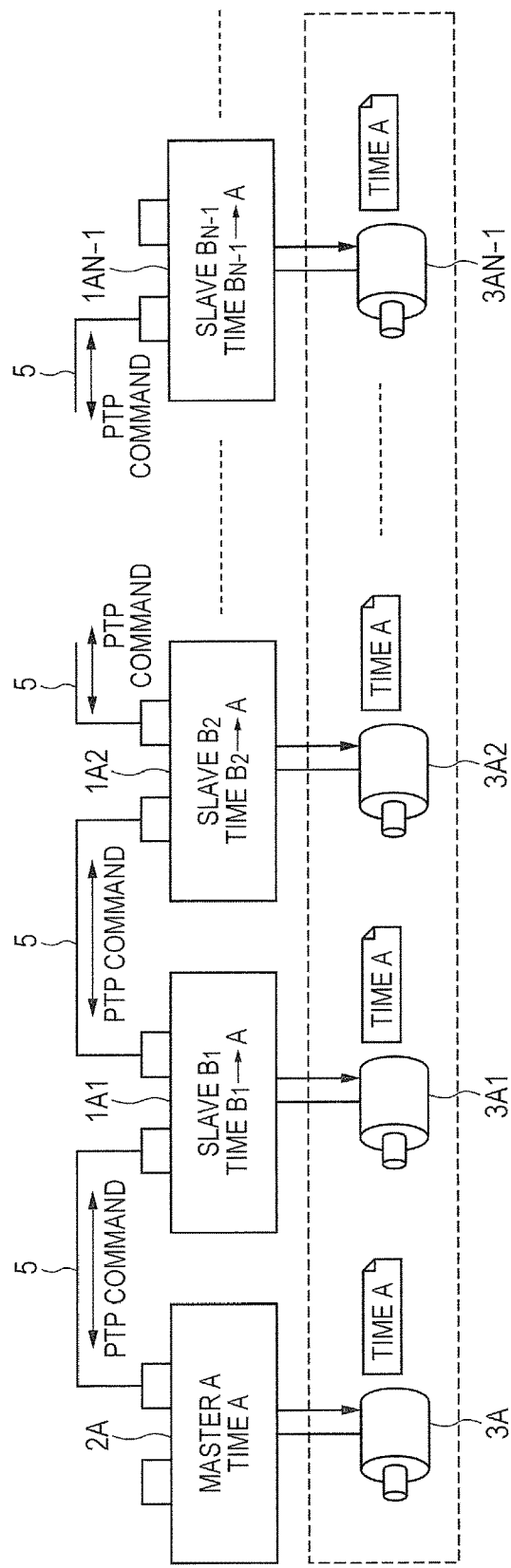
FIG. 7 is a block diagram illustrating one example of a configuration of the industrial motor control system for a plurality of industrial motors.

A case where the functional safety-oriented equipment in FIG. 6 has been incorporated into the industrial motor control system for the plurality of industrial motors will be described using FIG. 7. FIG. 7 is a block diagram illustrating one example of a configuration of the industrial motor control systems for the plurality of industrial motors. A slave $B_1$(1A1), a slave $B_2$(1A2) . . . , and a slave $B_{N-1}$(1AN-1) that are the plurality of pieces of functional safety-oriented equipment are time-synchronized with a master A (2A) that is the time distribution source in accordance with the PTP so as to simultaneously start the operations of N (N=2, 3, . . . ) industrial motors 3A, 3A1, 3A2, . . . 3AN-1 at a specific time A and to diagnose the MTU 15 loaded on each piece of the functional safety-oriented equipment simultaneously.

Figure 8:
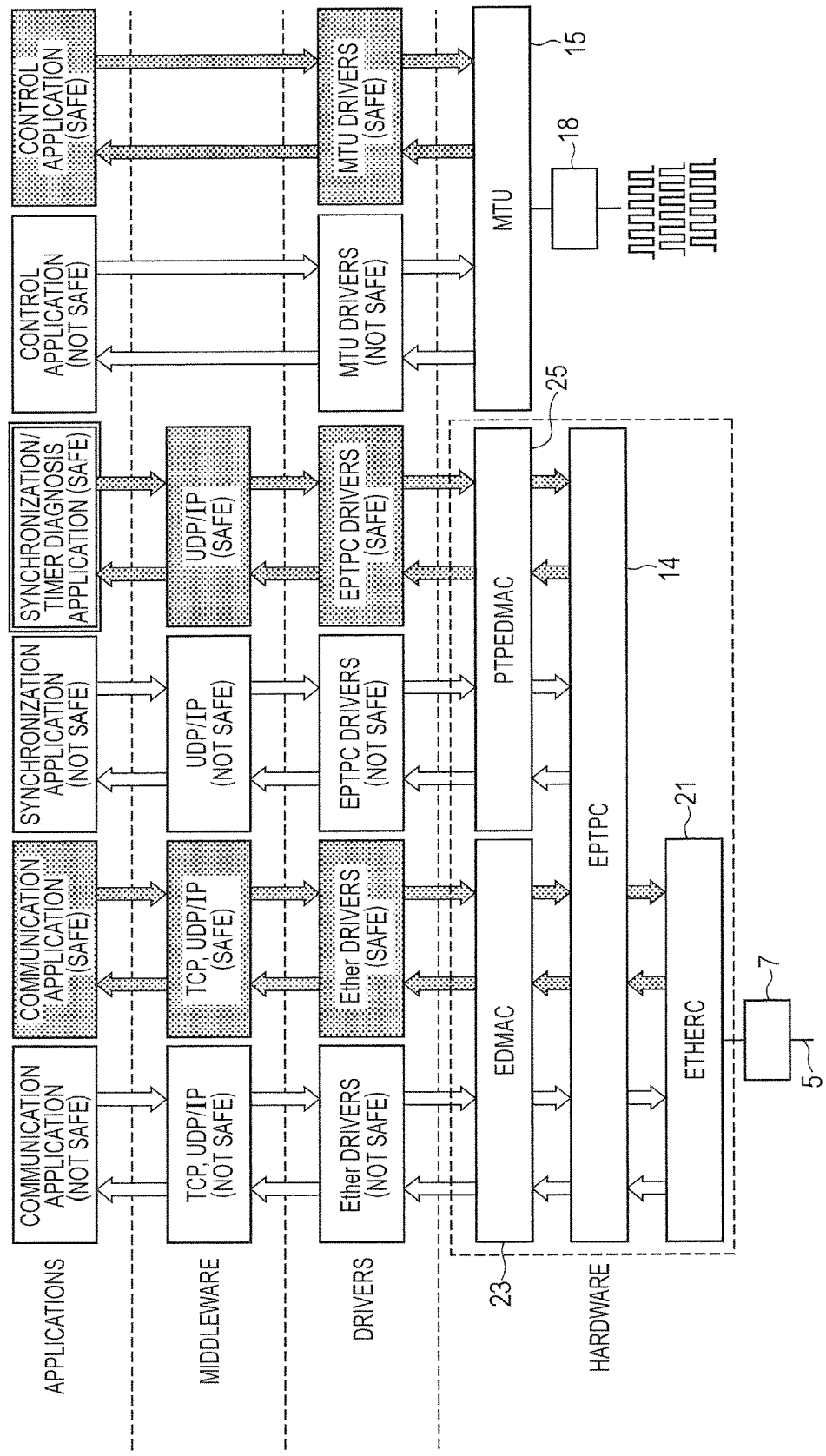
FIG. 8 is a block diagram illustrating one example of a logical composition in the functional safety-oriented industrial motor control system.

FIG. 8 is a diagram illustrating one example of a logical composition when the second embodiment has been applied to the functional safety-oriented equipment. Although the case where the EPTPC related hardware has the two-channel configuration is illustrated in FIG. 2 in the first embodiment, here, a one-channel configuration will be described.

The communication application and the control application handle the safety data and non-safety data and mutually separate processing details, the buses and the memories to be arranged in hardware. Accordingly, one piece of software that is peculiar to the safety data and another piece of software that is peculiar to the non-safety data are prepared and used. In addition, an application (hereinafter, a synchronization-timer diagnosis application) having a time synchronization function and a timer diagnosis function handles the safety data and a time synchronization application that handles the non-safety data is also loaded on the system.

The communication application is a communication application for industrial Ethernet and EtherNet/IP, PROFINET, EtherCAT and so forth are available as the representative industrial Ethernet standards. The control application is adapted to control the operations of the industrial motors that have been incorporated into the AC servo motor, the robot and so forth. TCP and UDP/IP each performs logical communication coupling management, TCP-based or UDP-based packet transmission-reception processing, management of coupling equipment information and so forth. In addition, since only the UDP-based packet or frame is handled in the PTP, middleware that only UDP/IP has been mounted may be used and/or the middleware may not be mounted. An Ethernet driver performs frame transmission-reception processing, coupling and detection of the Ethernet cable 5 and so forth by using the ETHERC 21 and the EDMAC 23. An ERPTC driver performs PTP-based time synchronization by using the EPTPC 14. An MTU driver generates the PWM waveform signal that is a control signal for the industrial motor 3 on the basis of a timing signal of the MTU 15 by using the MTU 15. Then, the MTU driver outputs the PWM waveform signal via the I/O port 18. Since the ETHERC 21 and the EDMAC 23 have been already described in the first embodiment, description thereof is omitted here.

Figure 9:
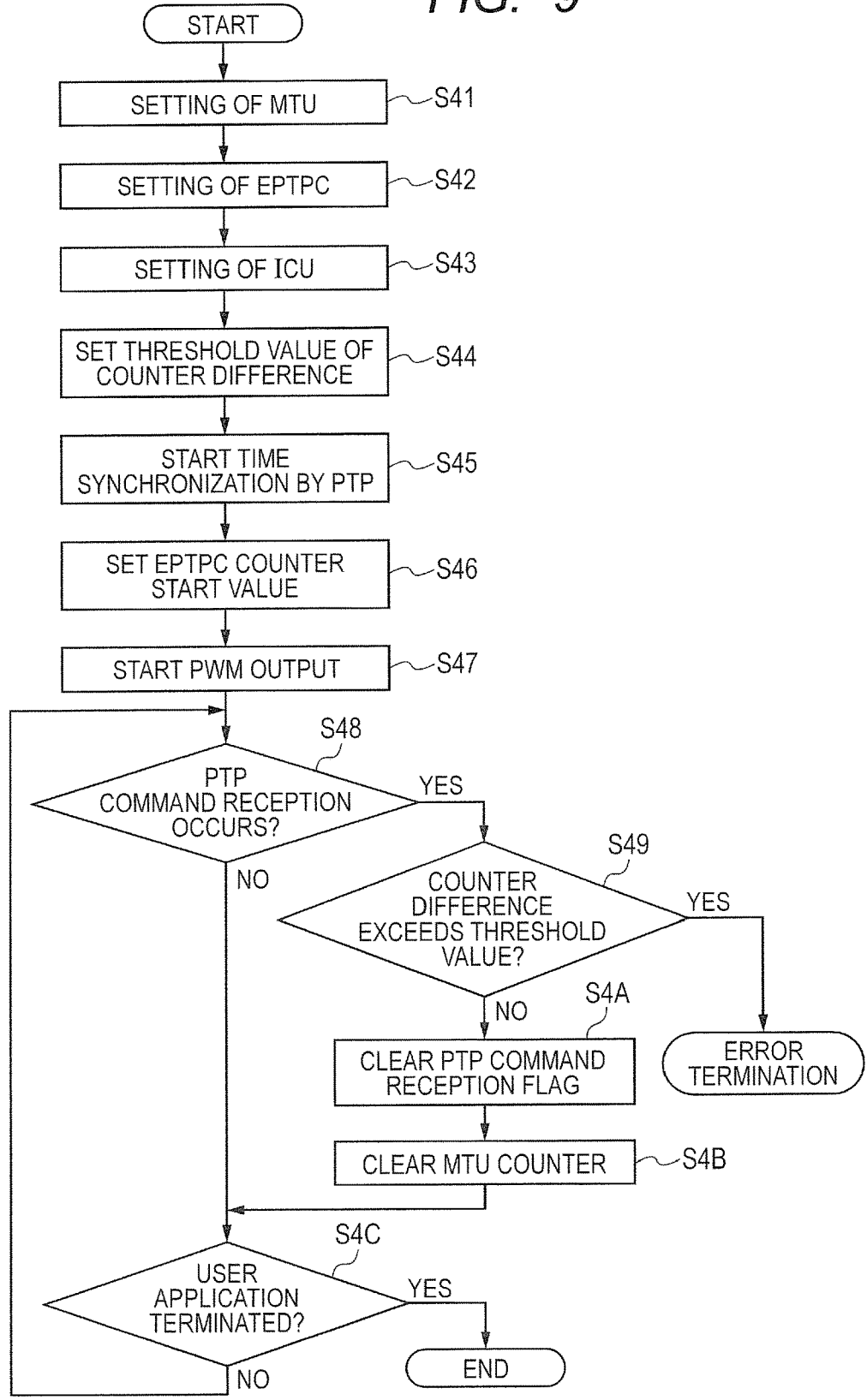
FIG. 9 is a flowchart illustrating one example of operations of steady processing performed when diagnosing the fault of the counter pertaining to a situation where a timer generates a PWM waveform signal.
Figure 10B:
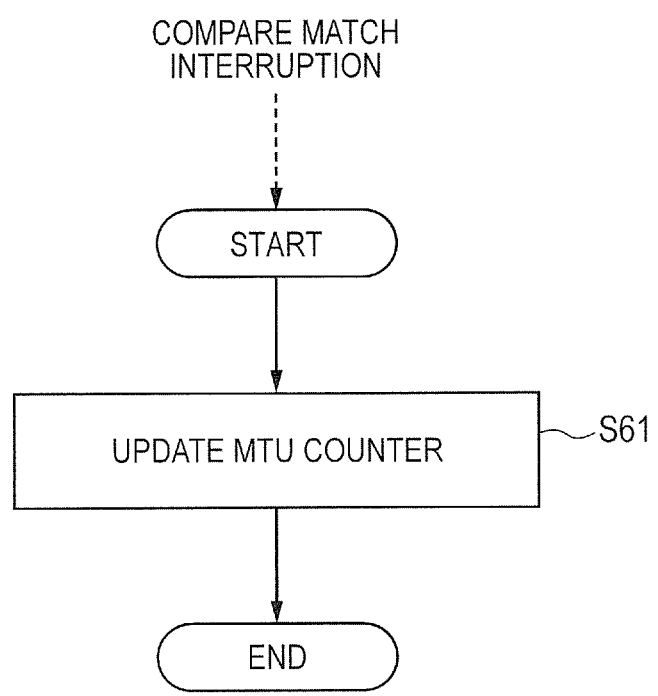
FIG. 10B is a flowchart illustrating one example of operations of compare match interruption processing performed when diagnosing the fault of the counter pertaining to the situation where the timer generates the PWM waveform signal.
Figure 11:
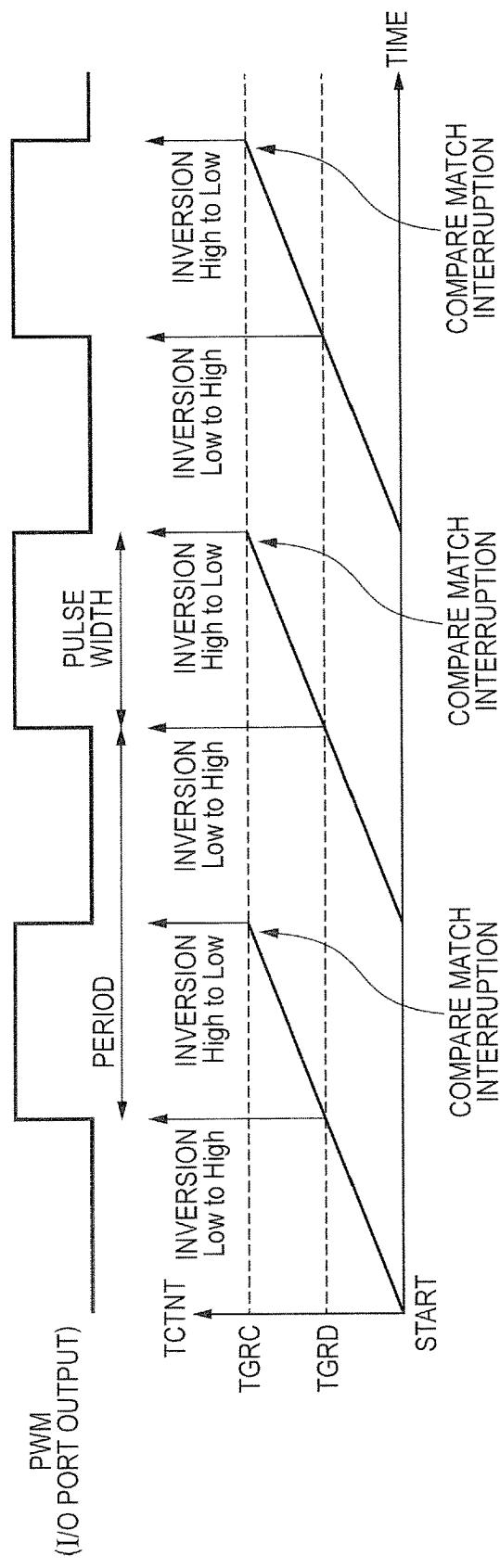
FIG. 11 is a timing chart illustrating one example of an operation of the counter in the situation where the timer generates the PWM waveform signal.

Flows of operations performed when a PWM operation mode 1 has been used as the operation mode of the MTU 15 in the time synchronization-timer diagnosis application according to the second embodiment will be described using FIG. 9, FIG. 10A, FIG. 10B and FIG. 11. FIG. 9 is a flowchart illustrating one example of operations of steady processing performed when diagnosing the fault of the counter pertaining to a case where the timer generates the PWM waveform signal. FIG. 10A is a flowchart illustrating one example of operations of PTP command reception interruption processing performed when diagnosing the fault of the counter pertaining to the case where the timer generates the PWM waveform signal. FIG. 10B is a flowchart illustrating one example of operations of compare match interruption processing performed when diagnosing the fault of the counter pertaining the case where the timer generates the PWM waveform signal. FIG. 11 is a timing chart illustrating one example of the operation of the timer counter of the MTU when the timer generates the PWM waveform signal. Here, as interrupts, a PTP command reception interrupt generated from the ETTPC 14 and a compare match interrupt generated from the MTU 15 are used. The PTP command reception interrupt is generated when the EPTPC 14 has received a PTP-based Sync command from the time distribution source and has updated a time difference (offsetFromMaster) between the counter and the time distribution source. The compare match interrupt is generated from the MTU 15 when the timer counter that is included in the MTU 15 and generates the PWM waveform signal is cleared at the period of the PWM waveform signal as illustrated in FIG. 11.

<Steady Processing>

Step S41: After the user application has been started, the CPU 13 starts the time synchronization-timer diagnosis application. Then, the CPU 13 performs setting of the prescaler of the MTU 15, setting of the counting operation mode (the PWM operation mode 1), setting of the period of the PWM waveform signal, setting of the interrupt, initialization of the MTU counter (mtu_count←0) and so forth.

Step S42: the CPU 13 performs setting of the synchronization mode of the EPTPC 14, setting of the PTP command reception interrupt and so forth.

Step S43: The CPU 13 sets the ICU 6 so as to notify the CPU 13 of reception of the compare match interrupt from the MTU 15 and of the PTP command reception interrupt from the EPTPC 14. In addition, the CPU 13 initializes the PTP command reception flag (ptp_flag←false).

Step S44: The CPU 13 sets the upper limit value of the absolute values of the difference between the values of the MTU counter (mtu_count) and the EPTPC counter (ptp_count) used for decision in fault detection as the threshold value. The threshold value (thresh) is set by taking the error of the timer counter of the MTU 15 caused by the presence of the oscillator, the delay caused by interruption processing, the error on the protocol operation of the PTP and so forth into consideration. One example of the threshold value will be indicated by the later described formula (4).

Step S45: The CPU 13 stars time synchronization with the time of the external equipment 2 that is the time distribution source by using the EPTPC 14 and in accordance with the PTP. Here, one piece of equipment having the most accurate clock signal is selected from one piece or the plurality of pieces of equipment as the time distribution source in accordance with the PTP.

Step S46: The CPU 13 reads out the count value of the local clock counter 1441 of the EPTPC 14 and sets the read-out count value as the start value of the EPTPC counter (ptp_start←LCCV).

Step S47: The CPU 13 instructs to start output of the PWM waveform signal of the MTU 15. In addition, as described in step S23 in the first embodiment, it is also possible to start output of the PWM waveform signal of the MTU 15 by coupling the event signal by the ELC 17. Here, the operation of the MTU 15 will be described using FIG. 11. The timer counter of the MTU 15 counts up the value and when the count value (TCNT) reaches TGRD, inverts the output from the I/O port 18 from Low to High. The timer counter keeps counting-up the value, and when the count value reaches TGRC, inverts the output from the I/O port 18 from High to Low and notifies the CPU 13 of generation of the compare match interrupt. The timer counter outputs the PWM waveform signals from the I/O port 18 by repetitively performing the above-mentioned operation. In FIG. 11, one example of the PWM waveform signal of 400 µs in period, 200 µs in pulse width and 50% in duty is illustrated.

Step S48: The CPU 13 confirms whether PTP command reception occurs. Whether PTP command reception occurs is decided with a PTP command reception flag (ptp_flag). Incase of occurrence of PTP command reception (YES), the CPU 13 proceeds to the process in step S49. In case of no occurrence of PTP command reception (NO), the CPU 13 proceeds to the process in step S4C.

Step S49: The CPU 13 confirms whether the absolute value of the counter difference exceeds the threshold value. The counter different is the difference obtained by subtracting the EPTPC counter (ptp_count) that has been weighted with the ratio of the operating frequency ($f_{mtu}$) of the MTU 15 to the operating frequency ($f_{ptp}$) of the EPTPC 14 from the MTU counter (mtu_count).

Counter difference=|mtu_count−($f_{mtu}/f_{ptp}$)ptp_count|

When the counter difference exceeds the threshold value (YES), the CPU 13 detects it as the fault and terminates the process with error. When the counter difference does not exceed the threshold value (NO), the CPU 13 proceeds to the process in step S4A.

Step S4A: The CPU 13 clears the PTP command reception flag (ptp_flag←false).

Step S4B: The CPU 13 clears the MTU counter (mtu_count←0).

Step S4C: The CPU 13 decides whether the user application is terminated. When the user application is terminated (YES), the CPU 13 terminates the process. When the user application is not terminated (NO), the CPU 13 returns to step S4B and continues execution of the process.

<Interruption Processing>

In the following, the PTP command reception interrupt will be described.

Step S51: When the PTP command reception interrupt has been generated from the EPTPC 14, the CPU 13 reads out the count value of the local clock counter 1441 of the EPTPC 14 and updates the value of the EPTPC counter using the read-out count value. An updated value is a value (ptp_count←LCCV-ptp_start) obtained by subtracting the start value of the PTP counter that has been set in the previous PTP command reception interruption processing or the steady processing from the count value (LCCV) of the local clock counter 1441 of the EPTPC 14.

Step S52: The CPU 13 reads out the count value (TCNT) of the timer counter of the MTU 15 and updates the value of the MTU counter using the read-out count value. The updated value is the value obtained by adding the count value (TCNT) of the timer counter of the MTU 15 to the current value of the MTU counter (mtu$_{13}$ count←mtu_count+TCNT).

Step S53: The CPU 13 reads out the count value of the local clock counter 1441 of the EPTPC 14 and sets the read-out count value as the start value of the EPTPC counter (ptp_start←LCCV).

Step S54: The CPU 13 sets the TPT command reception flag (ptp_flag←true).

Next, in the following, the compare match interrupt will be described.

Step S61: When the compare match interrupt has been generated from the MTU 15, the CPU 13 updates the value of the MTU counter to a value obtained by adding a count value (PWMP) that corresponds to the period of the PWM waveform signal to the current value of the MTU counter (mtu_count←mtu_count+PWMP).

One Example of the Threshold Value

One example of the threshold value (thresh) will be described. Similarly to the first embodiment, when the threshold value is separated into "thresh$_{osc}$" caused by the error of the timer counter of the MTU 15 due to the presence of the oscillator, "thresh$_{ptp}$" caused by the error on the protocol operation of the PTP, "thresh$_{int}$" caused by the interruption processing and "thresh$_{flu}$" caused by the fluctuation in processing that would occur depending on the states of the pipeline and the bus of the CPU 13, the formula (3) is obtained.

$$thresh=thresh_{osc}+thresh_{ptp}+thresh_{int}+thresh_{flu} \quad (3)$$

When the operating frequency of the CPU 13 is f$_{cpu}$, the operating frequency of the MTU 15 is f$_{mtu}$=f$_{cpu}$/16, the accuracy of the oscillator that supplies the clock signal to the MTU 15 is x$_{osc}$ and a PTP command reception interval is t$_{p2}$, "thresh$_{osc}$" caused by the error of the timer counter of the MTU 15 due to the presence of the oscillator is indicated by the formula (3-1) in count number of the MTU counter.

$$thresh_{osc}=f_{mtu}*x_{osc}*t_{p2} \quad (3-1)$$

For example, when f$_{cpu}$=120 MHz, f$_{mtu}$=f$_{cpu}$/16=7.5 MHz, x$_{osc}$=100 ppm, and t$_{p2}$=1 s, thresh$_{osc}$=750 cycles is obtained.

The error on the protocol operation of the PTP is approximated as thresh$_{ptp}$<thresh$_{osc}$ similarly to that in the first embodiment.

When the operating frequency of the CPU 13 is f$_{cpu}$, an interruption processing occurrence frequency is y$_{int}$ and the cycle number of the interruption processing is n$_{int}$, "thresh$_{int}$" caused by the interruption processing is indicated by the formula (3-2) in count number of the MTU counter.

$$thresh_{int}=(f_{mtu}/f_{cpu})*(y_{int}*n_{int}) \quad (3-2)$$

Here, the PTP command reception interruption processing is made the same as the compare match interruption processing approximately in cycle number at the operating frequency of the CPU 13.

For example, it is assumed that f$_{cpu}$=120 MHz and f$_{mtu}$=f$_{cpu}$/16=7.5 MHz. In the interruption processing, n$_{int}$=100 cycles is obtained by adding also the interruption response time and the recovery time, setting the interruption response time to 10 cycles, setting the interruption recovery time to 10 cycles and setting the interruption processing to 80 cycles in average. When y$_{int}$=2,500 times because the compare match interrupt is generated from the 16-bit counter per 400 μs, thresh$_{int}$=15,625 cycles is obtained.

From the above, thresh$_{int}$>>thresh$_{osc}$>thresh$_{ptp}$ is established. "thresh$_{flu}$ is the upper limit value of the fluctuation in processing of the CPU 13 of the microcontroller 10A and is smaller than "thresh$_{int}$" similarly to that in the first embodiment and the formula (3) is approximated as the formula (4).

$$thresh=thresh_{int}+thresh_{flu}<thresh_{int}+thresh_{int}=2*(f_{mtu}/f_{cpu})*(y_{int}*n_{int}) \quad (4)$$

When the above-mentioned numeral values are applied to the formula (4), thresh=31,250 cycles is obtained.

In the second embodiment, the industrial motor is controlled by outputting the PWM waveform signal by using the timer counter of the MTU 15 and the timer counter of the MTU 15 is diagnosed by using the local clock counter 1441 of the EPTPC 14 in parallel with execution of the above-mentioned operation.

According to the second embodiment, it is possible to diagnose the malfunction of the counter that would occur when the timer generates the PWM waveform signal. In addition, it is possible to apply the system according to the second embodiment to the industrial motor control equipment and the functional safety-oriented equipment (conforming to the standards such as IEC 61508 and so forth).

Third Embodiment

Figure 12:
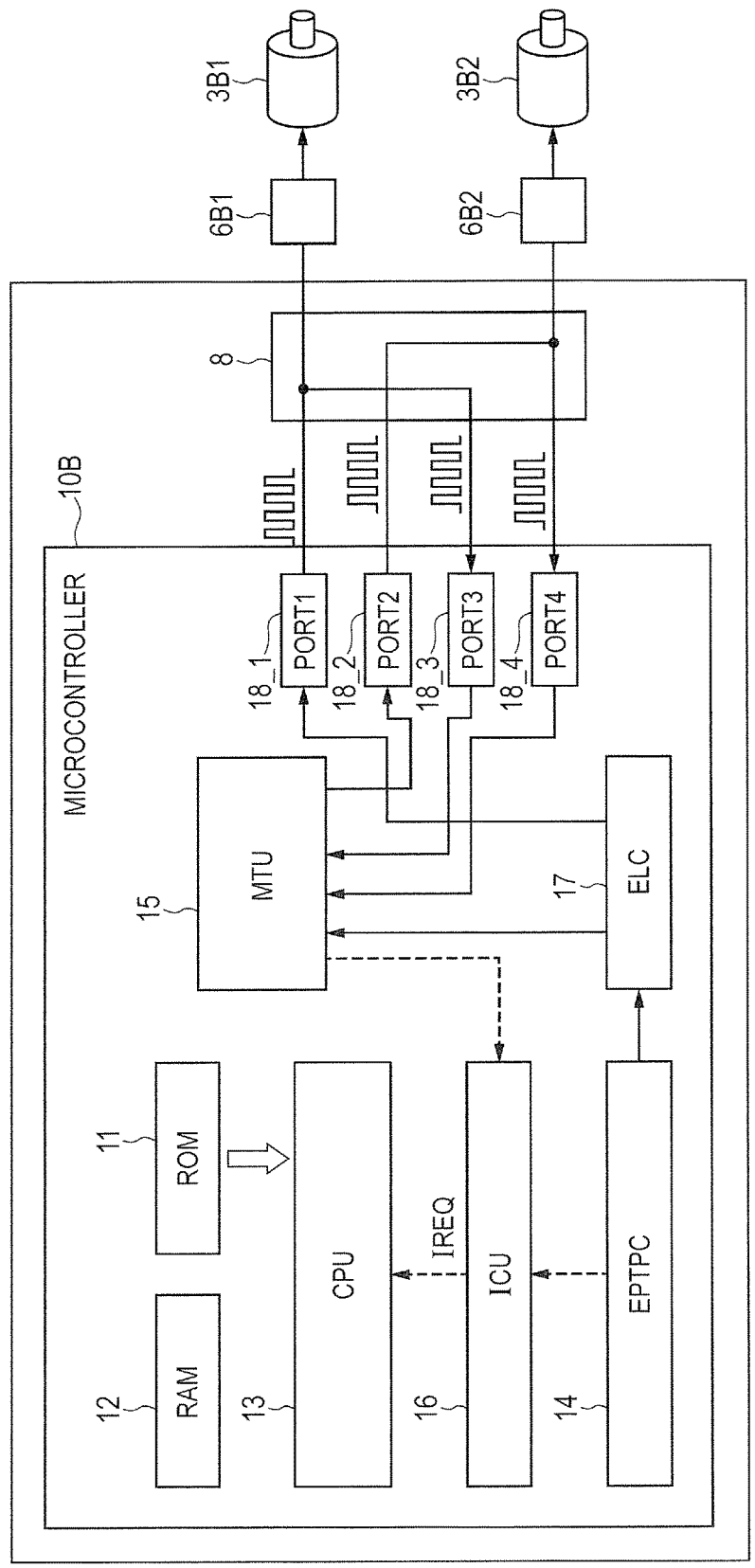
FIG. 12 is a block diagram illustrating one example of an industrial motor system according to a third embodiment.
Figure 13:
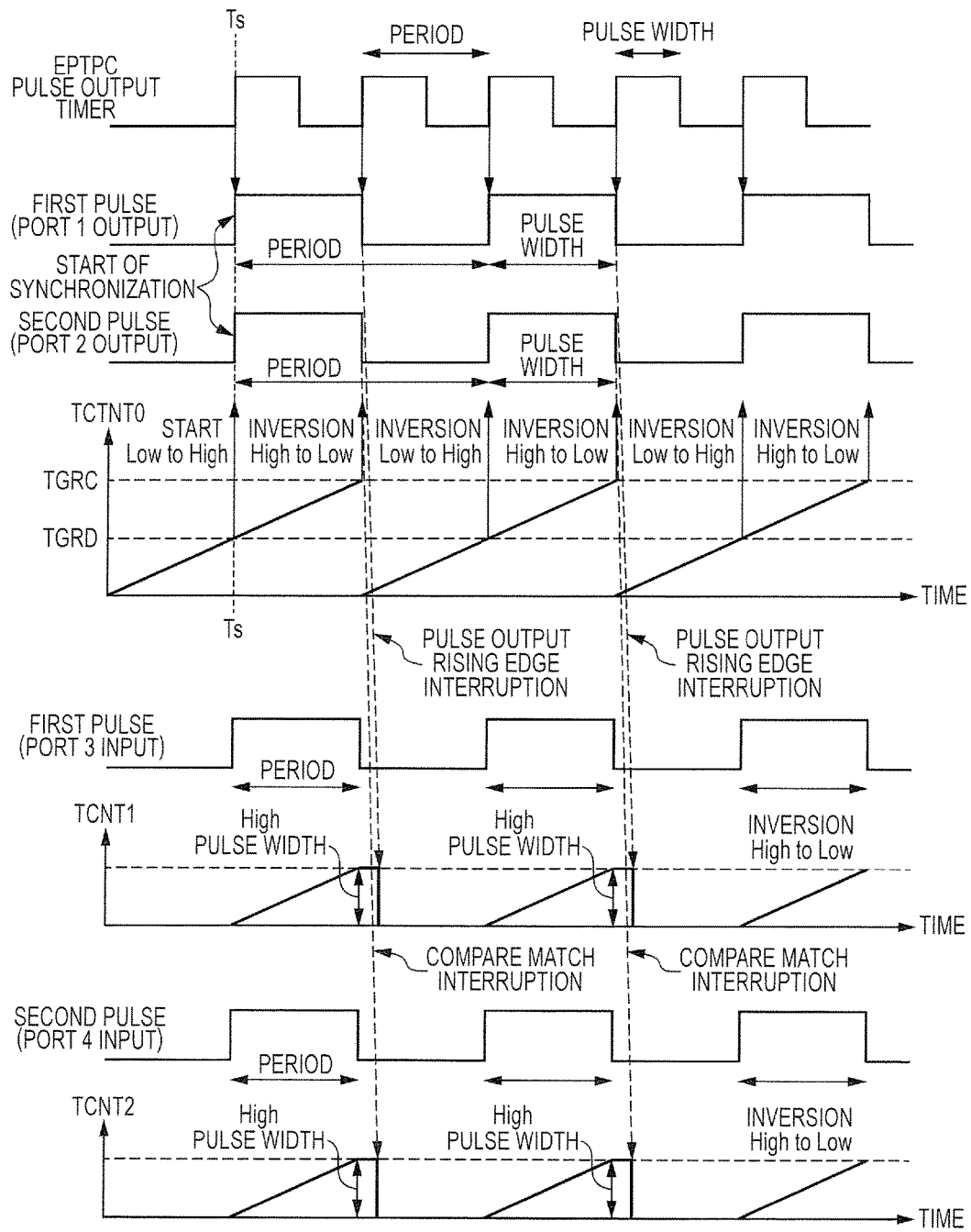
FIG. 13 is a timing chart illustrating one example of a schematic operation performed in PWM waveform comparison.

FIG. 12 is a block diagram illustrating one example of a configuration of an industrial motor control system according to the third embodiment. FIG. 13 is a timing chart illustrating one example of the operations of the pulse output timer of the EPTPC 14 and the timer counter of the MTU 15 in PWM waveform comparison.

A first pulse and a second pulse that have been generated on the basis of the two kinds of timers (the EPTPC 14 and the MTU 15) are respectively output from a first port (PORT1) 18_1 and a second port (PORT2) 18_2 and are respectively coupled to a first industrial motor 3B1 and a second industrial motor 3B2 respectively via motor drivers 6B1 and 6B2. In addition, the first pulse and the second pulse are branched via a coupling circuit 8 that is arranged outside a microcontroller 10B and the first pulse and the second pulse are respectively input into a third port (PORT3) 18_3 and a fourth port (PORT4) 18_4 that are other general-purpose ports. Then, the fault of the timer is detected by measuring and mutually comparing pulse widths of the first pulse and the second pulse. Alternatively, a physical switch that is operable from the outside may be arranged, and thereby the PWM waveform signal may be output to the first industrial motor 3B1 and the second industrial motor 3B2 when controlling the motors and the PWM waveform signal may be input into the third port 18_3 and the fourth port 18_4 when making a diagnosis, instead of pulse branching. Here, the first port 18_1, the second port 18_2, the third port 18_3 and the fourth port 18_4 are I/O ports that configure part of the I/O port 18.

The first pulse generates the PWM waveform signal by making the rising edge of the pulse output timer of the EPTPC 14 output via a toggle. The second pulse generates the PWM waveform using a PWM waveform generation function (the PWM operation mode 1) of a channel 0 (MTU0) of the MTU 15 and starts outputting of the PWM waveform signal in synchronization with the first pulse in generation of the time match event of the EPTPC 14.

Incidentally, when the two microcontrollers are to be loaded for mutual monitoring, outputting of the PWM waveform signals and inputting of the PWM waveform signals (and comparison thereof) may be performed by the individual microcontrollers independently of each other or outputting of the PWM waveform signals and inputting of the PWM waveform signals (and comparison thereof) may be dually performed.

Figure 14:
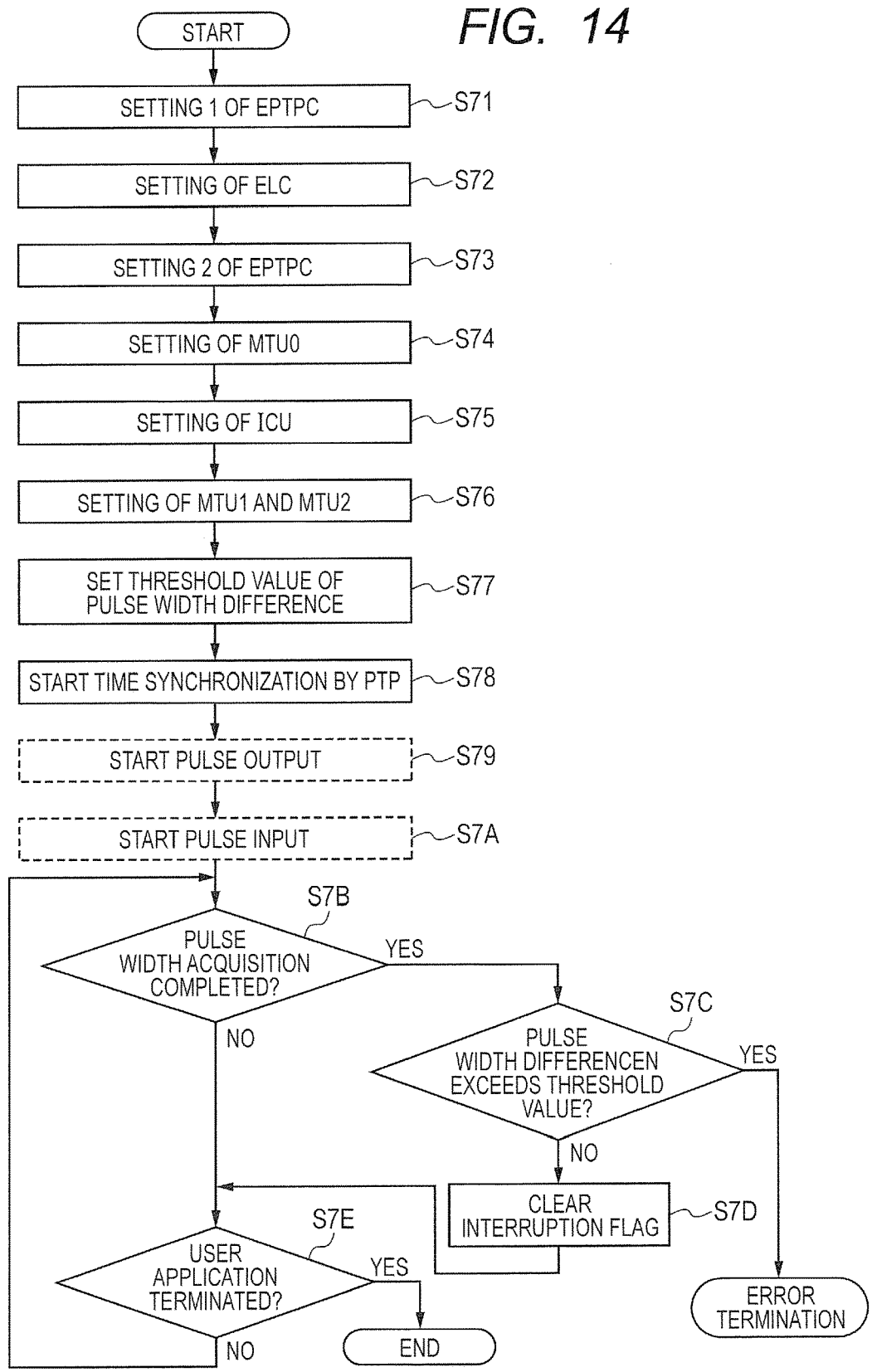
FIG. 14 is a flowchart illustrating one example of operations of steady processing performed in PWM waveform comparison.
Figure 15B:
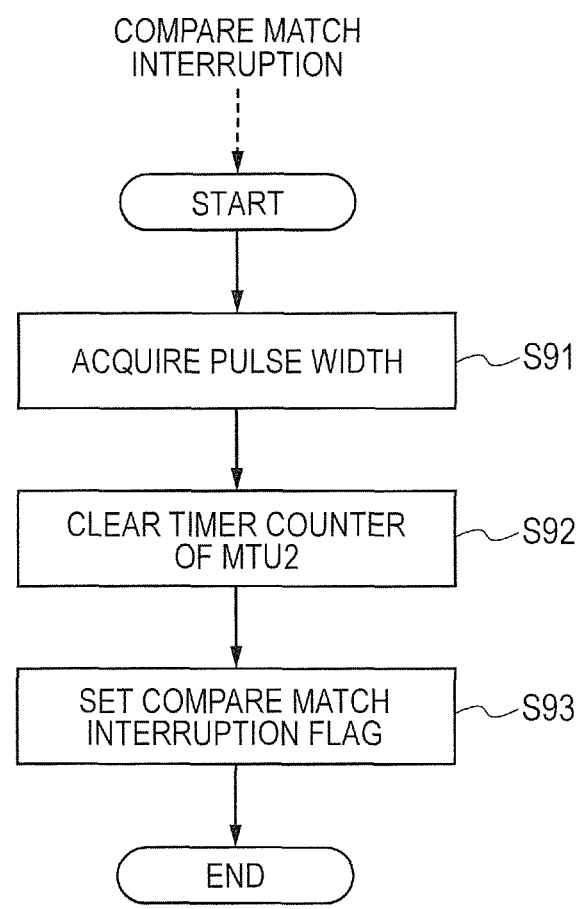
FIG. 15B is a flowchart illustrating one example of operations of compare match interruption processing performed in PWM waveform comparison.

Flows of operations of the third embodiment will be described using FIG. 14, FIG. 15A and FIG. 15B. FIG. 14 is a flowchart illustrating one example of operations of steady processing performed in PWM waveform comparison. FIG. 15A is a flowchart illustrating one example of operations of rising edge interruption processing performed in the PWM waveform comparison. FIG. 15B is a flowchart illustrating one example of operations of compare match interruption processing performed in the PWM waveform comparison. As interrupts, a pulse output rising edge interrupt that is generated from the EPTPC 14 and a compare match interrupt that is generated from the channel 0 (MTU0) are used. The pulse output rising edge interrupt is generated from the EPTPC 14 at a rise time that the waveform signal that is output from the pulse output timer of the EPTPC 14 changes from Low to High as illustrated in FIG. 13. The compare match interrupt is generated from the channel 0 (MTU0) when the timer counter that generates the PWM waveform signal of the MTU0 is cleared in the period of the PWM waveform signal as illustrated in FIG. 13.

<Steady Processing>

Step S71: The CPU starts the operations of the pulse output timer of the EPTPC 14 and a counter of the MTU0 in synchronization with each other at a specific time (defined as $T_s$). Synchronous start of the operations of the timer and the counter is performed by event signal coupling by the ELC 17.

Step S72: The CPU 13 couples the pulse output from the EPTPC 14 to an output of the I/O port 18 (the first port 18_1) by the ELC 17. Then, port output is performed by generating the pulses from the EPTPC 14 in a toggled output mode.

Step S73: The CPU 13 sets a timer start time of the pulse output timer of the EPTPC 14 to a synchronous start time (TMSTTR←Ts), sets the period to 200 μs (TMCYCR←200,000) and sets the pulse width to 100 μs (TMPLSR←100,000).

Step S74: The CPU 13 sets the operation mode of the MTU0 to the PWM operation model. Then, The CPU 13 sets a frequency of a clock signal supplied to the MTU0 to 120 MHz (PCLKA←120 MHz), sets the prescaler to PCLKA/16, sets a counter comparison value for Low to High inversion to 200 μs (TGRD←0x5DC) and sets a counter comparison value for High to Low inversion to 400 μs (TGRC←0xBB8). In addition, the CPU 13 sets the count value at the start time to a value that is smaller by one count than the counter comparison value for Low to High inversion such that the count value is inverted from Low to High directly after the timer and the counter have been started (TCNT←0x5DB (=TGRD-1)).

Step S75: The CPU 13 sets the ICU 16 so as to notify the CPU 13 of generation of the pulse output rising edge interrupt from the EPTPC 14 and the compare match interrupt from the counter whose count value is inverted from High to Low of the MTU0. In addition, the CPU 13 initializes the pulse output rising edge interruption flag of the EPTPC 14 and the compare match interruption flag of the MTU0 (ptp_flag←false, mtu0_flag←false).

Step S76: The CPU 13 uses channels that are different from the channels for PWM output for pulse width measurement of input pulses, and allocates a channel 1 (MTU1) to pulse width measurement of the first pulse and allocates a channel 2 (MTU2) to pulse width measurement of the second pulse. Then, the CPU 13 sets the frequency of the clock signal supplied to the MTU1 to 120 MHz (PCLKA←120 MHz), sets the prescaler to PCLKA/1, and sets the operation mode to an external pulse width measurement function mode so as to measure a High pulse width. The CPU 13 also performs setting in the same way for the MTU2.

Step S77: The CPU 13 sets the upper limit value of the absolute values of the pulse width difference used for decision of fault detection as the threshold value. The threshold value (thresh) is set by taking the error of the counter of the MTU 15 caused by the presence of the oscillator, the error on the protocol operation of the PTP and so forth into consideration. One example of the threshold value is indicated by the later described formula (6).

Step S78: The CPU 13 starts time synchronization with the time of another piece of external equipment in accordance with the PTP by using the EPTPC 14. Here, equipment having the most accurate clock signal is selected from one piece or the plurality of pieces of equipment as the time distribution source in accordance with the PTP.

Step S79: When the count value of the local clock counter 1441 of the EPTPC 14 reaches $T_s$ that has been set in step S73, the first pulse that the EPTPC 14 has generated and the second pulse that the MTU 15 has generated are respectively output from the first port 18_1 and the second port 18_2. Incidentally, hardware elements perform this step as follows.

First, a PWM waveform signal output operation performed by using the output timer of the EPTPC 14 will be described using FIG. 13. The pulse output timer rises from Low to High in synchronization with the timer start time ($T_s$) of the pulse output timer of the EPTPC 14 and outputs a pulse of 200 μs in period and 100 μs in pulse width. The first pulse rises from Low to High by rising of the pulse output timer and outputting from the first port 18_1 is started. The first pulse is inverted from High to Low by the next rising of the pulse output timer and the pulse output rising edge interrupt is generated. The PWM waveform signal of the first pulse is output from the first port 18_1 by repetitively performing this operation. This PWM waveform signal is 400 μs in period, 200 μs in pulse width and 50% in duty.

Next, a PWM waveform signal output operation using the timer counter of the MTU0 will be described by using FIG. 13. The timer counter of the MTU0 counts up the value and inverts the output from the second port 182 from Low to High when the count value (TCNT0) reaches TGRD. The timing of this operation is synchronized with the timer start time $T_s$. The timer counter keeps counting-up the value and inverts the output from the second port 18_2 from High to Low when the count value reaches TGRC and thereby the compare match interrupt is generated. The timer counter outputs the PWM waveform signal of the second pulse from the second port 18_2 by repetitively performing the above-mentioned operation. This PWM waveform signal is 400 μs in period, 200 μs in pulse width and 50% in duty.

Step S7A: The first pulse that has been output from the first port 18_1 is input into the third port 18_3 and the second pulse that has been output from the second port 18_2 is input into the fourth port 18_4. Incidentally, the hardware elements also perform this step as follows.

First, measurement of the pulse width of the first pulse by using the timer counter of the MTU1 will be described by using FIG. 13. Counting of the count number of the timer counter of the MTU1 is started at a rise of the first pulse input into the third port 18_3 and counting is terminated at a fall of the first pulse. A High pulse width is measured on the basis of the count value (TCNT1) of the timer counter that has been acquired at that moment.

Next, measurement of the pulse width of the second pulse by using the timer counter of the MTU2 will be described by using FIG. 13. Counting of the count number of the timer counter of the MTU2 is started at a rise of the second pulse input into the fourth port 18_4 and counting is terminated at a fall of the second pulse. A High pulse width is measured on the basis of the count value (TCNT2) of the timer counter that has been acquired at that moment.

Step S7B: The CPU 13 decides whether acquisition of the pulse widths has been completed. The decision is made by setting the pulse output timer rising edge interruption flag (ptp_flag) of the EPTPC 14 and the compare match interruption flag (mtu_flag) of the MTU 15. When acquisition of the pulse widths is completed (YES), the CPU 13 proceeds to the process in step S7C and when acquisition of the pulse widths is not completed (NO), the CPU proceeds to the process in step S7B.

Step S7C: The CPU 13 confirms whether the absolute value of the difference between the pulse widths exceeds the threshold value.

Pulse width difference=|mtu1_count−mtu2_count|

When the absolute value of the pulse width difference exceeds the threshold value, the CPU detects it as the fault and terminates the process with error.

Step S7D: When the absolute value of the pulse width difference does not exceed the threshold value in step S7C, the CPU 13 clears the pulse output timer rising edge interruption flag of the EPTPC 14 and the compare match interruption flag of the MTU 15 (ptp_flag←false, mtu_flag←false).

Step S7E: The CPU 13 decides whether the user application is terminated. When the user application is terminated, the CPU 13 terminates the process. When the user application is not terminated, the CPU 13 returns to step S7B and continues execution of the process.

<Interruption Processing>

As described above, the timer counter of the MTU1 performs the counting-up operation in the High period of the first pulse that has been input from the third port 18_3 and stops the counting-up operation in the Low period of the first pulse. In addition, the timer counter of the MTU2 performs the counting-up operation in the High period of the second pulse that has been input from the fourth port 18_4 and stops the counting-up operation in the Low period of the second pulse.

In the following, a pulse output timer rising edge interrupt will be described.

Step S81: When the pulse output timer rising edge interrupt has been generated from the EPTPC 14, the CPU 13 reads out the count value (TCNT1) of the timer counter of the MTU1 and acquires the read-out count value as the pulse width of the first pulse (mtu1_count←TCNT1).

Step S82: The CPU 13 clears the timer counter of the MTU1 (TCNT1←0).

Step S83: The CPU 13 sets the pulse output timer rising edge interruption flag of the EPTPC 14 (ptp_flag←true).

In the following, the compare match interrupt will be described.

Step S91: When the compare match interrupt has been generated in the counter whose value is inverted from High to Low of the MTU0, the CPU 13 reads out the count value (TCNT2) of the timer counter of the MTU2 and acquires the read-out count value as the pulse width of the second pulse (mtu2_count←TCNT2).

Step S92: The CPU 13 clears the timer counter of the MTU2 (TCNT2←0).

Step S93: The CPU 13 sets the compare match interruption flag in the counter whose value is inverted from High to Low of the MTU0 (mtu0_flag←true).

One Example of the Threshold Value

One example of the threshold value (thresh) will be described. When the threshold value is separated into "$threshold_{ppg}$" for a propagation delay of a pulse that is propagated via the coupling circuit that is arranged outside the microcontroller, in addition to separation into "$thresh_{osc}$" caused by the error of the MTU counter due to the presence of the oscillator and "$thresh_{ptp}$" caused by the error on the protocol operation of the PTP, the formula (5) is obtained.

$$thresh=thresh_{osc}+thresh_{ptp}+thresh_{ppg} \quad (5)$$

Incidentally, since, in the third embodiment, the timer counter used for acquisition of the pulse widths is started and stopped in hardware, there is no influence of the delay in the interruption processing.

When a rising edge interruption interval is $t_{p3}$, "$thresh_{osc}$" is expressed as the formula (5-1) similarly to that in the second embodiment. For example, when $f_{cpu}$=120 MHz, $f_{mtu}$=$f_{cpu}$=120 MHz, $x_{osc}$=100 ppm, and $t_{p3}$=400 μs, $thresh_{osc}$=5 cycles is obtained.

$$thresh_{osc}=f_{mtu}*x_{osc}*t_{p3} \quad (5-1)$$

It is possible to reduce the error on the protocol operation of the PTP down to 1 μs to 100 ns in time similarly to the first embodiment and $thresh_{ptp}$=8 to 80 cycles in the count number of the MTU counter.

For example, when a high speed is set to $3.0\times10^8$ m/s, a relative permittivity of a conductor that the pulse is propagated is set to 10 and a wiring distance is set to 10 cm, the propagation delay of the pulse becomes not more than 10 ns and is approximated as $thresh_{ppg}<thresh_{osc}$.

From the above, the formula (5) is approximated as the formula (6).

$$thresh=thresh_{osc}+thresh_{ptp}+thresh_{ppg}<2*thresh_{osc}+thresh_{ptp} \quad (6)$$

When the above-mentioned numeral values are applied to the formula (6), "thresh" amounts to 100 cycles.

In the third embodiment, the PWM waveform signal that is generated by the pulse output timer of the EPTPC 14 (the first timer) with a predetermined value of the local clock counter (the first counter) is output from the first I/O port and is input from the third I/O port and the pulse width thereof is measured by the timer counter (the third counter) of the MTU 15 (the second timer). The PWM waveform signal that is generated by the timer counter (the second counter) of the MTU 15 (the second timer) with the predetermined value of the local clock counter (the first counter) is output from the second I/O port and is input from the fourth I/O port and the pulse width thereof is measured by the timer counter (the fourth counter) of the MTU 15 (the second timer). Thereby, it is possible to diagnose the PWM waveform signal generation and output functions by the timer without stopping execution of the user program.

Fourth Embodiment

Since the MTU 15 according to the first embodiment includes the plurality of channels, 16-bit counters of two channels are coupled together in cascade to be used as one 32-bit counter. In the 32-bit counter, overflow does not occur in actual operation.

FIG. 16 is a timing chart illustrating one example of the operation of the 32-bit counter according to the fourth embodiment. The 32-bit counter according to the fourth embodiment is configured such that 16 high-order bits are allocated to the counter of the channel 1 (the MTU1) of the MTU 15 and 16 low-order bits are allocated to the counter of the channel 2 (the MTU2) of the MTU 15. The count value of the counter of the MTU1 is counted up and the counter of the MTU2 is cleared and counting-up is started again from zero every time the counter of the MTU2 overflows, and thereby the two counters operate as one 32-bit counter.

Since the configuration and the operation of the 32-bit counter according to the fourth embodiment are the same as those of the counter according to the first embodiment except that the counter of the channel 1 (the MTU1) and the counter of the channel 2 (the MTU2) of the MTU 15 are used, operation setting for 32 bits is performed by coupling together the counters in cascade and generation of the overflow interrupt is substantially eliminated, description thereof is omitted. The counters to be coupled together in cascade are not limited to the counters of the channel 1 and the channel 2.

<Threshold Value>

One example of the threshold value (thresh) is approximated as the formula (7) similarly to that in the first embodiment.

$$\text{thresh} = f_{mtu}/f_{cpu})*(2*f_{cpu}*x_{osc}*t_{p1}+2*x_{int}*n_{int}) \quad (7)$$

Here, the operating frequency of the CPU 13 is $f_{cpu}$, the operating frequency of the MTU 15 is $f_{mtu}=f_{cpu}/16$, the accuracy of the oscillator that supplies the clock signal to the MTU 15 is $x_{osc}$, the time match event interval is $t_{p1}$, the interruption processing occurrence frequency is $x_{int}$ and the cycle number of the interruption processing is $n_{int}$.

Since generation of the overflow interruption from the MTU 15 is eliminated, the interruption processing occurrence frequency $x_{int}$ is reduced from 13 times down to two times of the time match event interruption processing in comparison with the occurrence frequency in the first embodiment. For example, when $f_{cpu}$=120 MHz, $f_{mtu}$=($f_{cpu}$/16)=7.5 MHz, $x_{osc}$=100 ppm, $t_{p1}$=100 ms, $x_{int}$=2 and $n_{int}$=100, thresh=175 cycles is obtained.

In the fourth embodiment, the 32-bit counter is configured by coupling together the two 16-bit counters in cascade. Thereby, it is possible to make the diagnosis that is more accurate than that in the first embodiment by reducing the interruption processing occurrence frequency. In addition, it is possible to diagnose the timer when the timer is used as the 32-bit counter.

Although, as mentioned above, the disclosure that has been made by the inventors and others of the present application has been specifically described on the basis of the preferred embodiments and the practical examples, it is needless to say that the present disclosure is not limited to the aforementioned embodiments and practical examples and may be altered and modified in a variety of ways within a range not deviating from the gist thereof.

What is claimed is:

1. A semiconductor device comprising:
a first timer that includes a first counter and performs time synchronization with the time of external equipment that is arranged outside the semiconductor device;
a second timer that includes a second counter; and
a CPU programmed to compare a count value of the first counter with a count value of the second counter and detect a malfunction of the second timer on the basis of a result of comparison,
wherein the CPU is further programmed to read out the count value of the first counter and the count value of the second counter with an interrupt that the first timer generates on the basis of the time synchronization, obtain a counter difference between the first counter and the second counter on the basis of the read-out count values, and detect the malfunction of the second timer when the counter difference is larger than a predetermined value.

2. The semiconductor device according to claim 1,
wherein the first timer generates the interrupt when the count value of the first counter has matched a predetermined value, and
wherein the second counter starts counting on the basis of the interrupt and stops counting on the basis of an interrupt that is generated following the previously generated interrupt.

3. The semiconductor device according to claim 2, further comprising:
an I/O port,
wherein the first timer generates a pulse width modulation signal on the basis of the count value of the first counter,
wherein the I/O port outputs the pulse width modulation signal to the outside of the semiconductor device, and
wherein the first timer receives a synchronization command from the external equipment and generates the interrupt when a time difference between the first timer and the external equipment has been updated.

4. The semiconductor device according to claim 1,
wherein, when the second counter overflows, an overflow value is added to the count value read out of the second counter.

5. A semiconductor device comprising:
a first timer that includes a first counter and performs time synchronization with the time of external equipment that is arranged outside the semiconductor device;

a second timer that includes a second counter; and
a CPU programmed to compare a count value of the first counter with a count value of the second counter and detect a malfunction of the second timer on the basis of a result of comparison,
wherein the first timer performs time synchronization in accordance with a time synchronization protocol (PTP) on a network and adjusts the count value of the first counter to the time of the external equipment.

6. The semiconductor device according to claim 5,
wherein the CPU is further programmed to read out the count value of the first counter and the count value of the second counter with an interrupt that the first timer generates on the basis of the time synchronization, obtain a counter difference between the first counter and the second counter on the basis of the read-out count values, and detect the malfunction of the second timer when the counter difference is larger than a predetermined value.

7. The semiconductor device according to claim 6,
wherein the first timer generates the interrupt when the count value of the first counter has matched a predetermined value, and
wherein the second counter starts counting on the basis of the interrupt and stops counting on the basis of an interrupt that is generated following the previously generated interrupt.

8. The semiconductor device according to claim 6, further comprising:
an I/O port,
wherein the first timer generates a pulse width modulation signal on the basis of the count value of the first counter,
wherein the I/O port outputs the pulse width modulation signal to the outside of the semiconductor device, and
wherein the first timer receives a synchronization command from the external equipment and generates the interrupt when a time difference between the first timer and the external equipment has been updated.

9. The semiconductor device according to claim 6,
wherein the predetermined value includes a fixed error.

10. The semiconductor device according to claim 9,
wherein the predetermined value is set on the basis of the accuracy of an oscillator that serves as an oscillation source of the second timer and an interruption processing cycle of the CPU.

11. The semiconductor device according to claim 6,
wherein, when the second counter overflows, an overflow value is added to the count value read out of the second counter.

12. The semiconductor device according to claim 6,
wherein the second timer includes a plurality of counters and one counter is configured by coupling together the counters in cascade and thereby increases an overflow value.

13. The semiconductor device according to claim 5,
wherein the time of the external equipment is selected in accordance with the PTP to have a most accurate clock signal from one or more pieces of equipment.

14. A semiconductor device comprising:
a first timer that includes a first counter and a pulse output timer and performs time synchronization with the time of external equipment that is arranged outside the semiconductor device;
a second timer that includes a second counter, a third counter and a fourth counter;
a first I/O port that outputs a first pulse that is generated by the pulse output timer;
a second I/O port that outputs a second pulse that is generated on the basis of counting of the second counter;
a third I/O port that inputs the first pulse that is output from the first I/O port;
a fourth I/O port that inputs the second pulse that is output from the second I/O port; and
a CPU,
wherein the third counter counts a pulse width of the first pulse that is input from the third I/O port,
wherein the fourth counter counts a pulse width of the second pulse that is input from the fourth I/O port, and
wherein the CPU is programmed to compare a count value of the third counter with a count value of the fourth counter and detect a malfunction of the second timer on the basis of a result of comparison.

15. The semiconductor device according to claim 14,
wherein the first timer performs time synchronization in accordance with a time synchronization protocol (PTP) on a network and adjusts the time that the first counter indicates to the time of the external equipment.

16. The semiconductor device according to claim 15,
wherein the pulse output timer generates the first pulse in synchronization with every reaching of the count value of the first counter to a predetermined value, wherein the second timer generates the second pulse in synchronization with every reaching of the count value of the first counter to the predetermined value, and
wherein the CPU is further programmed to read out the count value of the third counter with a first interrupt that the first timer generates, read out the count value of the fourth counter with a second interrupt that the second timer generates, obtain a counter difference between the third counter and the fourth counter on the basis of the read-out count values, and decide that the second timer has malfunctioned when the counter difference is larger that a predetermined value.

17. The semiconductor device according to claim 16,
wherein the first timer generates the first interrupt when the pulse of the pulse output timer rises, and
wherein the second timer generates the second interrupt when the count value of the second counter matches the predetermined value.

18. The semiconductor device according to claim 16,
wherein the predetermined value includes a fixed error.

19. The semiconductor device according to claim 18,
wherein the predetermined value is set on the basis of the accuracy of an oscillator that serves as an oscillation source of the second timer and a time synchronization error according to the PTP.

20. The semiconductor device according to claim 15,
wherein as the time of the external equipment that is arranged outside the semiconductor device, the time of equipment that has the most accurate clock signal in one piece or a plurality of pieces of equipment is selected in accordance with the PTP.

* * * * *